US009071734B2

(12) United States Patent
Ikeno

(10) Patent No.: US 9,071,734 B2
(45) Date of Patent: Jun. 30, 2015

(54) PRINTING SYSTEM, IMAGE PROCESSING APPARATUS, IMAGE PROCESSING METHOD, AND NON-TRANSITORY COMPUTER-READABLE MEDIUM FOR IMAGE PROCESSING AND PRINTING OF SCANNED IMAGE DATA

(71) Applicant: CANON KABUSHIKI KAISHA, Tokyo (JP)

(72) Inventor: Hideo Ikeno, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/091,115

(22) Filed: Nov. 26, 2013

(65) Prior Publication Data

US 2014/0168707 A1 Jun. 19, 2014

(30) Foreign Application Priority Data

Dec. 17, 2012 (JP) .................................. 2012-275101

(51) Int. Cl.
*G06K 9/20* (2006.01)
*H04N 1/21* (2006.01)
*G06K 15/02* (2006.01)
*H04N 1/00* (2006.01)

(52) U.S. Cl.
CPC .............. *H04N 1/21* (2013.01); *G06K 15/1886* (2013.01); *H04N 1/00225* (2013.01); *H04N 1/00228* (2013.01); *H04N 1/00233* (2013.01); *H04N 1/00244* (2013.01); *H04N 1/00482* (2013.01); *H04N 2201/0094* (2013.01); *H04N 2201/0087* (2013.01)

(58) Field of Classification Search
None
See application file for complete search history.

(56) References Cited

U.S. PATENT DOCUMENTS

| 6,456,740 | B1 * | 9/2002 | Carini et al. | 382/187 |
| 8,218,159 | B2 | 7/2012 | Ikeno | |
| 8,606,902 | B2 | 12/2013 | Ikeno | |
| 8,724,166 | B2 * | 5/2014 | Nakabayashi | 358/1.9 |
| 8,824,822 | B2 * | 9/2014 | Lei et al. | 382/254 |
| 2003/0167228 | A1 * | 9/2003 | Waida et al. | 705/40 |
| 2005/0128516 | A1 * | 6/2005 | Tomita | 358/1.15 |

FOREIGN PATENT DOCUMENTS

| JP | 7-146927 A | 6/1995 |
| JP | 10-126607 A | 5/1998 |

* cited by examiner

*Primary Examiner* — Paul F Payer
(74) *Attorney, Agent, or Firm* — Fitzpatrick, Cella, Harper & Scinto

(57) ABSTRACT

A system comprises a generation unit which generates a browsing image by performing image processing for image data acquired by scanning; a holding unit which holds, in a storage unit for each use when the image data was printed out, information which defines image processing for converting the browsing image into image data for printing; a specification unit which specifies a use of image data corresponding to the browsing image upon accepting an instruction to print the browsing image; a conversion unit which converts the browsing image into image data for printing by deciding, in accordance with the information in the storage unit, image processing corresponding to the use of the specified image data, and applying the decided image processing to the browsing image; and a control unit which controls a printing unit to output the image data for printing.

12 Claims, 21 Drawing Sheets

FIG. 9A

| WHOLE | SPREAD (PUNCH BINDING) | |
| --- | --- | --- |
| | A4, PORTRAIT | |
| | LEFT BINDING | |
| | SHARPENING | |
| | OCR | |
| p1 | PAGE EXTRACTION (MARGIN INFORMATION) | |
| | PUNCH HOLE TRACE ERASE | |
| p2 | PAGE EXTRACTION (MARGIN INFORMATION) | |
| | PUNCH HOLE TRACE ERASE | |
| | ROTATION | 90° CLOCKWISE |

FIG. 9B

| WHOLE | B6 | |
| --- | --- | --- |
| | SHARPENING | |
| | OCR | |
| p1 | ROTATION | 90° CLOCKWISE |

| PROCESSING FOR BROWSING | CONVERSION FOR PRINTING |
|---|---|
| ROTATION | COUNTERCLOCKWISE ROTATION (ROTATION ANGLE FORMULA) |
| PAGE EXTRACTION | RETURN TO DETECTION MARGIN |
| PUNCH TRACE ERASE | PUNCH PROCESSING |
| STAPLING | STAPLING |
| SPREAD | PAGE COMPOSITION |

| PROCESSING FOR BROWSING | CONVERSION FOR PRINTING |
|---|---|
| ROTATION | – |
| PAGE EXTRACTION | – |
| PUNCH TRACE ERASE | – |
| STAPLING | – |
| SPREAD | – |

| ADDITIONAL PROCESSING IN PRINTING |
|---|
| COMPOSITION OF FORM A |

F I G. 11

1101

| PRINT DOCUMENT | ¥¥Archive¥Report¥Item0077_reserch.pdf ～1102 |
| --- | --- |
| PRINTING DESTINATION | PRINTER AAA ▼ ～1103 |
| PRINTING METHOD | ⦿ RESTORATION PRINTING ◯ NORMAL PRINTING |
| RESTORATION ALTERNATE METHOD | PUNCHING IS IMPOSSIBLE<br>▨ STAPLE AT SAME POSITION<br>☑ PRINT SHADOWS ON ONLY FIRST PAGE<br>☐ DO NOTHING |
| PRINTING RANGE | ⦿ ALL ～1107<br>◯ SELECTED RANGE ～1108<br>◯ DESIGNATED PAGES [　　　] ～1109 |

1104　1105

1106

CANCEL　　PRINT 1111　　1110

FIG. 12

| 1201 | 1202 DETECTION RANGE | 1203 DETECTION TARGET PAGE | 1204 DETERMINATION CONDITION | 1205 USE |
|---|---|---|---|---|
| | ▨ | FIRST PAGE | REGION IS EXTRACTED<br>OCR IS EXECUTED<br>CHARACTER STRING "TRIAL RECORD" IS DETECTED | RECORD MATERIAL |
| | ▨ | FIRST PAGE | OCR IS EXECUTED<br>"TOTAL" AND CURRENCY MARK "¥", "$", OR "円" ARE DETECTED | REQUESTED MATERIAL |
| | ▱ | SECOND TO FIFTH PAGES | REGION IS EXTRACTED<br>CHARACTER STRING "XXX LAW OFFICE." IS DETECTED | RECORD MATERIAL |

F I G. 13

| | 1302 | 1303 | 1304 | 1305 |
|---|---|---|---|---|
| 1301 RESTORATION PROCESSING | RESTORATION NECESSARY ARRANGEMENT | | ALTERNATE NECESSARY ARRANGEMENT | ALTERNATE METHOD |
| 1306 PUNCHING | NO PUNCHER | | PRESENCE OF STAPLER | • SUBSTITUTE STAPLING (TWO SIDE PORTIONS)<br>• PRINT SHADOWS ON ONLY FIRST PAGE<br>• DO NOTHING |
| | | | ABSENCE OF STAPLER | • PRINT SHADOWS ON ONLY FIRST PAGE<br>• DO NOTHING |
| 1307 STAPLING | NO STAPLER | | BINDING AT TWO SIDE PORTIONS & TWO HOLES PUNCHABLE | • SUBSTITUTE TWO-HOLE PUNCHING<br>• PRINT SHADOWS ON ONLY FIRST PAGE<br>• DO NOTHING |
| | | | OTHERS | • PRINT SHADOWS ON ONLY FIRST PAGE<br>• DO NOTHING |
| 1308 TAB PAPER INSERTION | NO INSERTER | | ALL | • INSERT BLANK PAPER<br>• DO NOTHING |

PRINTING SYSTEM, IMAGE PROCESSING APPARATUS, IMAGE PROCESSING METHOD, AND NON-TRANSITORY COMPUTER-READABLE MEDIUM FOR IMAGE PROCESSING AND PRINTING OF SCANNED IMAGE DATA

BACKGROUND OF THE INVENTION

1. Field of the Invention

The present invention relates to a printing system, image processing apparatus, image processing method, and non-transitory computer-readable medium and, more particularly, to image processing and printing of scanned image data.

2. Description of the Related Art

There is a use to browse and print, from a PC, data obtained by scanning and digitizing an original. In this case, when a scanned document is digitized and saved, the image data is saved after undergoing image processes such as image sharpening, paper rotation, and page separation in consideration of browsability on a PC or terminal used to browse digital data. In some cases, the image data undergoes OCR by taking account of reprocessing of a digital document and diversion of data.

When the user prints a document which has been digitized and saved, he manually designates a page layout and finishing processing such as punching or stapling.

As a technique of outputting digital image data, in Japanese Patent Laid-Open No. 10-126607, original information and user identification information are encoded in advance at the hidden information portion of an image. Then, a user who operates a copying machine is specified. If the operating user matches the user identification information at the hidden portion, the hidden portion is decoded and the image is printed; if they do not match each other, the image is printed together with the hidden information. In Japanese Patent Laid-Open No. 7-146927, when the user designates a printing use in printing, the contents of restoration processing are changed to perform use-specific printing.

A user who prints digital data obtained by digitizing and saving an original is not always a user who grasps all the contents of the original. For example, when an original is bound, the user may make finishing settings and print settings different from those of the original. In a printing result with such output settings, the body region may be spoiled owing to, for example, the difference of the binding position. In a case in which a user instructed to print digital data prints mechanically without knowing the origin of the digital data, it is difficult to designate a use at the time of printout as in Japanese Patent Laid-Open No. 7-146927.

A user who handles many fixed-form documents decides an output form for each paper use in most cases. For example, for a document such as a trial record, the format of a paper document is determined, and data is desirably printed out in the same format as that of the original. In contrast, a paper such as a fee statement or voucher is digitized, saved, and undergoes OCR to extract data for use in calculation of an amount claimed. Then, the data is pasted to the same format as a requested accompanying material after printing. In this printing use, the user wants to print the data in the same direction as that of browsing data regardless of the orientation of the original in scanning, composite the data with the form of the requested accompanying material, and print.

To reliably print scanned digital data by everyone in accordance with a use, it is necessary to convert image data and make print settings in accordance with the state of an original in scanning and the use of the document.

SUMMARY OF THE INVENTION

According to one aspect of the present invention, there is provided a printing system comprising: a generation unit configured to generate a browsing image by performing image processing for image data acquired by scanning; a holding unit configured to hold, in a storage unit for each use when the image data was printed out, information which defines image processing for converting the browsing image into image data for printing; a specification unit configured to specify a use of image data corresponding to the browsing image upon accepting an instruction to print the browsing image; a conversion unit configured to convert the browsing image into image data for printing by deciding, in accordance with the information held in the storage unit, image processing corresponding to the use of the image data specified by the specification unit, and applying the decided image processing to the browsing image; and a control unit configured to control a printing unit to output the image data for printing.

According to another aspect of the present invention, there is provided an image processing apparatus comprising: a generation unit configured to generate a browsing image by performing image processing for image data acquired by scanning; a holding unit configured to hold, in a storage unit for each use when the image data was printed out, information which defines image processing for converting the browsing image into image data for printing; a specification unit configured to specify a use of image data corresponding to the browsing image upon accepting an instruction to print the browsing image; a conversion unit configured to convert browsing image into image data for printing by deciding, in accordance with the information held in the storage unit, image processing corresponding to the use of the image data specified by the specification unit, and applying the decided image processing to the browsing image; and a control unit configured to control a printing unit to output the image data for printing.

According to another aspect of the present invention, there is provided an image processing method comprising: generating a browsing image by performing image processing for image data acquired by scanning; holding, in a storage unit for each use when the image data was printed out, information which defines image processing for converting the browsing image into image data for printing; specifying a use of image data corresponding to the browsing image upon accepting an instruction to print the browsing image; converting the browsing image into image data for printing by deciding, in accordance with the information held in the storage unit, image processing corresponding to the use of the image data specified in the specifying step, and applying the decided image processing to the browsing image; and controlling a printing unit to output the image data for printing.

According to another aspect of the present invention, there is provided a non-transitory computer-readable medium storing a program for causing a computer to function as a generation unit configured to generate a browsing image by performing image processing for image data acquired by scanning, a holding unit configured to hold, in a storage unit for each use when the image data was printed out, information which defines image processing for converting the browsing image into image data for printing, a specification unit configured to specify a use of image data corresponding to the browsing image upon accepting an instruction to print the browsing image, a conversion unit configured to convert the browsing image into image data for printing by deciding, in accordance with the information held in the storage unit, image processing corresponding to the use of the image data specified by the specification unit, and applying the decided image processing to the browsing image, and a control unit configured to control a printing unit to output the image data for printing.

According to the present invention, even if the user does not know the use of a printing target, he can obtain a printing result complying with the use of each printing target.

Further features of the present invention will become apparent from the following description of exemplary embodiments (with reference to the attached drawings).

BRIEF DESCRIPTION OF THE DRAWINGS

FIGS. 9A and 9B are tables showing original detection & image processing information in scanning;

FIGS. 10A, 10B, and 10C are tables each exemplifying the structure of a restoration processing table which defines restoration processing to be executed;

FIG. 11 is a view exemplifying a print setting screen for accepting print settings;

FIG. 12 is a table exemplifying the structure of a use specification table used to specify the use of a document;

FIG. 13 is a table exemplifying the structure of an alternate means table for obtaining an alternate means of restoration processing;

DESCRIPTION OF THE EMBODIMENTS

First Embodiment

System Configuration

Figure 1:
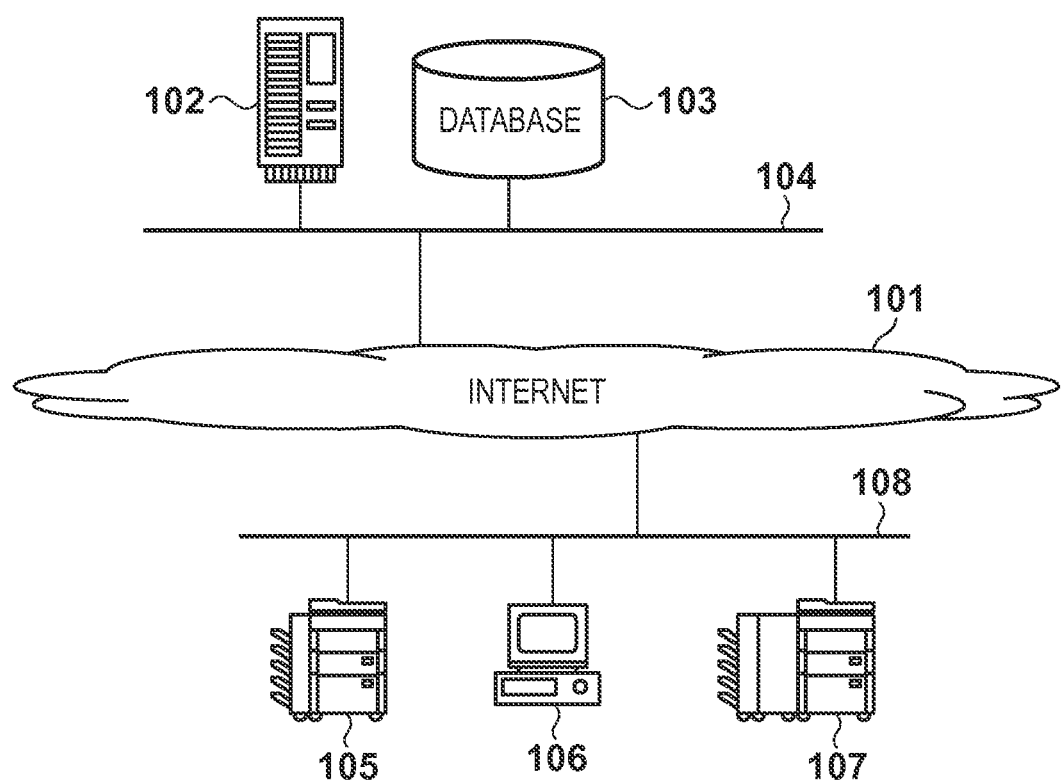
FIG. 1 is a view exemplifying the configuration of a printing system according to the first embodiment.

An embodiment of the present invention will be explained with reference to the accompanying drawings. FIG. 1 shows an overall printing system according to the embodiment. This system performs image processing for an image scanned by an image processing apparatus, and saves it in a server as an image suited to browsing. An arbitrary user can print the saved image by using an arbitrary image processing apparatus.

A server 102 is an information processing apparatus laid open to the Internet 101 and is connected via a LAN 104 to a database 103 serving as a save location for various data. Although FIG. 1 shows only one server for descriptive convenience, a plurality of servers physically exist in some cases. Although the database 103 is provided separately from the server 102 in FIG. 1, the server 102 may incorporate a database. The server 102 is not limited to the arrangement in which it is laid open to the Internet 101, but may be arranged in, for example, a LAN 108.

The server 102 receives image data scanned and input by image processing apparatuses 105 and 107. The server 102 performs image processing (to be described later) for the received image data, and stores the processed image data in the database 103. When printing image data stored in the database 103, the server 102 performs image processing for printing on image data, and provides the user with a user interface for issuing a print instruction. The database 103 receives image data via the server 102 and stores it. Also, the database 103 saves various programs and data regarding the present invention (to be described later).

The image processing apparatuses 105 and 107 and a PC 106 exemplifies a user environment where they are connected via the LAN 108 and also connected to the Internet 101. Each of the image processing apparatuses 105 and 107 includes a scanner, and can transmit information of an original detected in scanning and scanned image data to the server 102. The user accesses the server 102 via the PC 106. The user can browse image data stored in the database 103 via the PC 106 and server 102, and print it by using the image processing apparatus 105 or 107.

Although FIG. 1 shows a multi-function peripheral as the image processing apparatus, the image processing apparatus suffices to be a single scanner for a scanning use. For a printing use, the image processing apparatus suffices to be a printer serving as a printing unit having no scanner. Further, an image processing apparatus used for scanning and an image processing apparatus used for printing may be different.

In FIG. 1, the PC 106 is used to access the server 102. However, the PC 106 need not always be connected to the LAN 108 as long as the PC 106 can access the server 102. The device can be a mobile terminal (not shown) which uses a telephone line or the like. Further, an image processing apparatus used for printing need not be connected via the LAN 108 to the PC 106 which issues a print instruction, as long as the server 102 can transmit data.

(Image Processing Apparatus)

Figure 2:
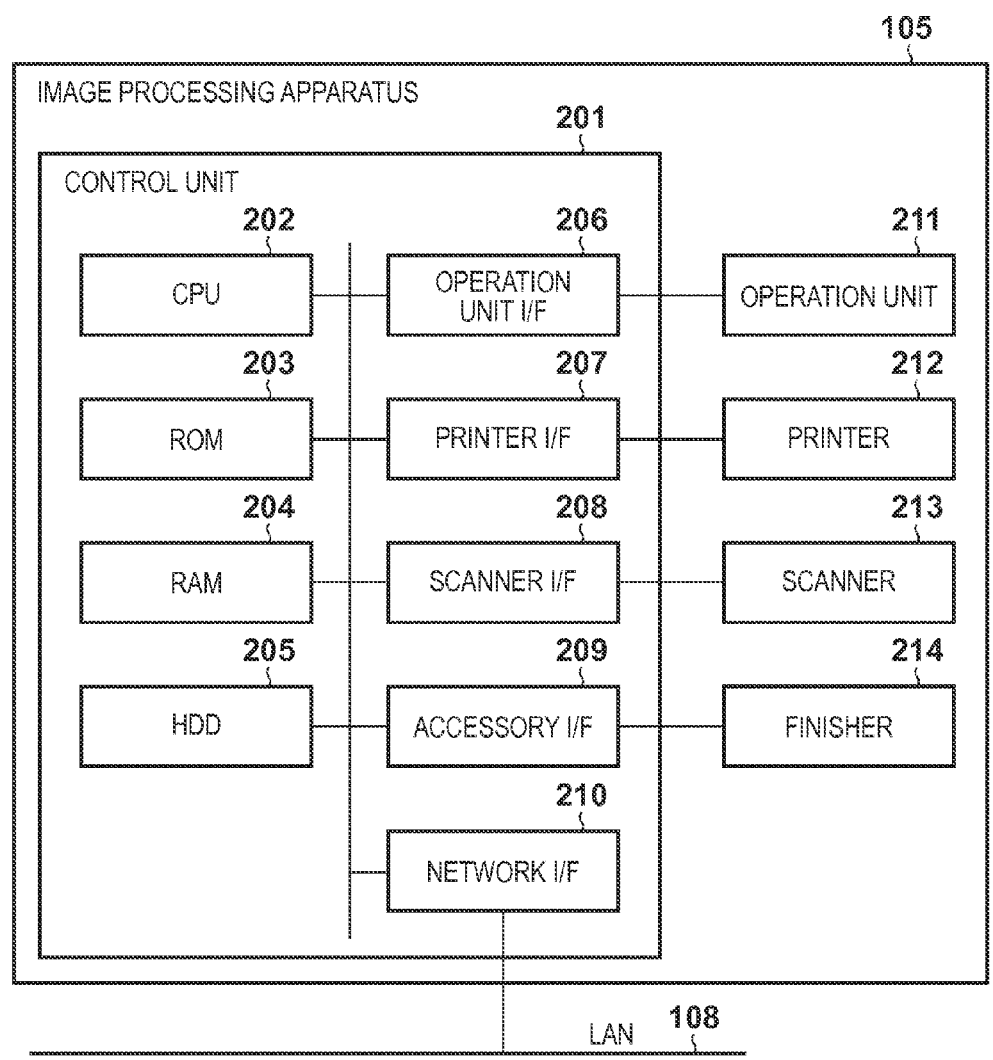
FIG. 2 is a block diagram exemplifying the arrangement of an image processing apparatus.

FIG. 2 is a block diagram showing the arrangement of the image processing apparatus 105 according to the embodiment. A control unit 201 including a CPU 202 controls the overall operation of the image processing apparatus 105. The CPU 202 reads out a control program (not shown) stored in a ROM 203 serving as a storage unit, and performs various control operations such as reading control and transmission control. The control program includes a controller control unit 402 to be described later with reference to FIG. 4. A RAM 204 is used as a temporary storage area such as a main memory or work area for the CPU 202.

An HDD 205 stores image data, various programs, or various information tables. An operation unit I/F 206 connects an operation unit 211 and the control unit 201. The operation unit 211 includes a liquid crystal display having the touch panel function, and a key board (neither is shown). A Web browser 404 and applications 409 and 410 of the image processing apparatus 105 call an API (Application Programming Interface) 403 and virtual machine API 406 in accordance with processing, and request the processing of the controller control unit 402, thereby displaying an operation screen on the liquid crystal display of the operation unit 211.

A printer I/F 207 connects a printer 212 and the control unit 201. Image data to be printed by the printer 212 is transferred from the control unit 201 via the printer I/F 207, and the printer 212 prints it on a printing medium such as paper. The Web browser 404 and applications 409 and 410 of the image processing apparatus 105 call the API 403 and virtual machine API 406 in accordance with processing, and request the processing of the controller control unit 402, thereby executing print processing.

A scanner I/F 208 connects a scanner 213 and the control unit 201. The scanner 213 reads an image on an original to generate image data, and inputs the image data to the control unit 201 via the scanner I/F 208. The Web browser 404 and applications 409 and 410 of the image processing apparatus 105 (to be described later) call the API 403 and virtual machine API 406 in accordance with processing, and request the processing of the controller control unit 402, thereby executing scan processing and receiving image data.

An accessory I/F 209 connects a finisher 214 and the control unit 201. In the embodiment, the finisher 214 is capable of punch processing. Although FIG. 2 shows the finisher 214 as an example of an accessory to be connected, one or a plurality of other accessories are also connectable. Examples of other accessories are a puncher which forms a punch hole, a stapler which performs stapling, a bookbinding unit which performs bookbinding, and a sorter which sorts output materials.

A network I/F 210 connects the control unit 201 (image processing apparatus 105) to the LAN 108. The network I/F 210 transmits image data and information to an external apparatus on the LAN 108, and receives various kinds of information from the external apparatus on the LAN 108.

Note that the image processing apparatus 105 has been explained with reference to FIG. 2, but the image processing apparatus 107 also has the same arrangement except for an accessory connected via the accessory I/F 209.

(Server)

Figure 3:
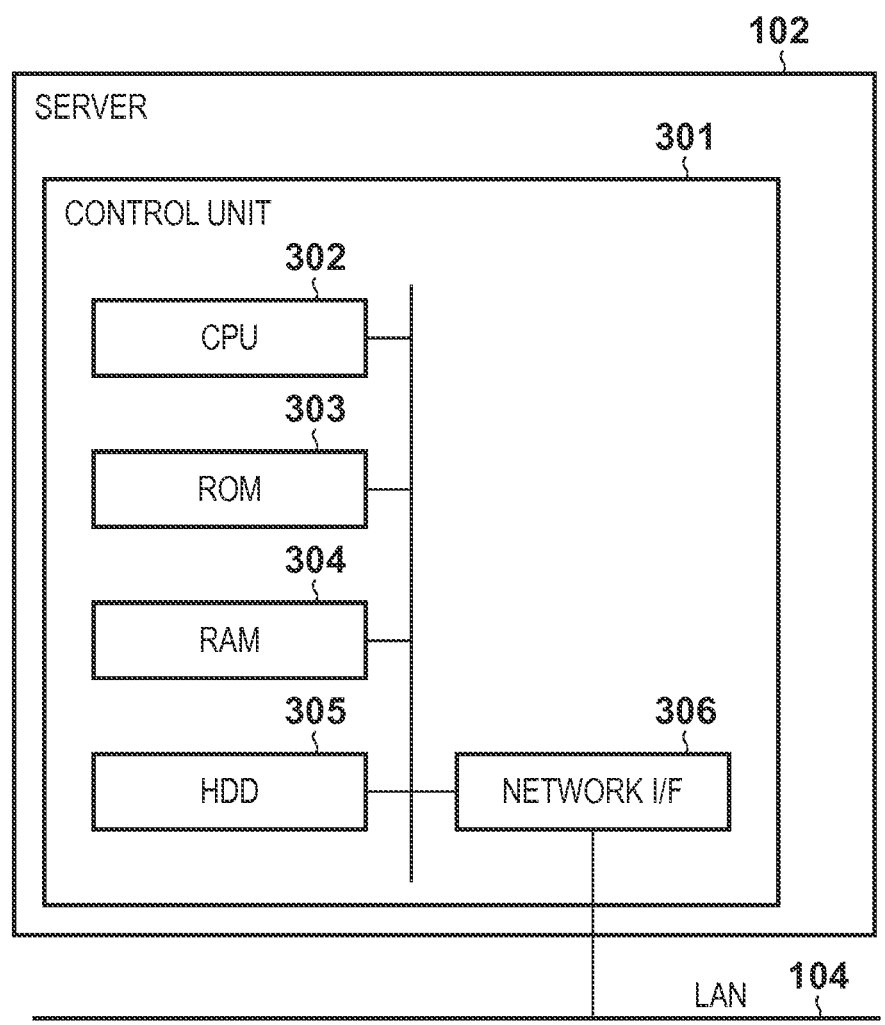
FIG. 3 is a block diagram exemplifying the arrangement of a server.

FIG. 3 is a block diagram showing the arrangement of the server 102 which provides various services according to the embodiment. A control unit 301 including a CPU 302 controls the overall operation of the server 102. The CPU 302 reads out a control program stored in a ROM 303, and executes various control processes. A RAM 304 is used as a temporary storage area such as a main memory or work area for the CPU 302. An HDD 305 stores image data, various programs, or various information tables (to be described later).

A network I/F 306 connects the control unit 301 (server 102) to the LAN 104. The network I/F 306 transmits/receives various kinds of information to/from another apparatus on the LAN 104.

[Software Arrangement]

Figure 4:
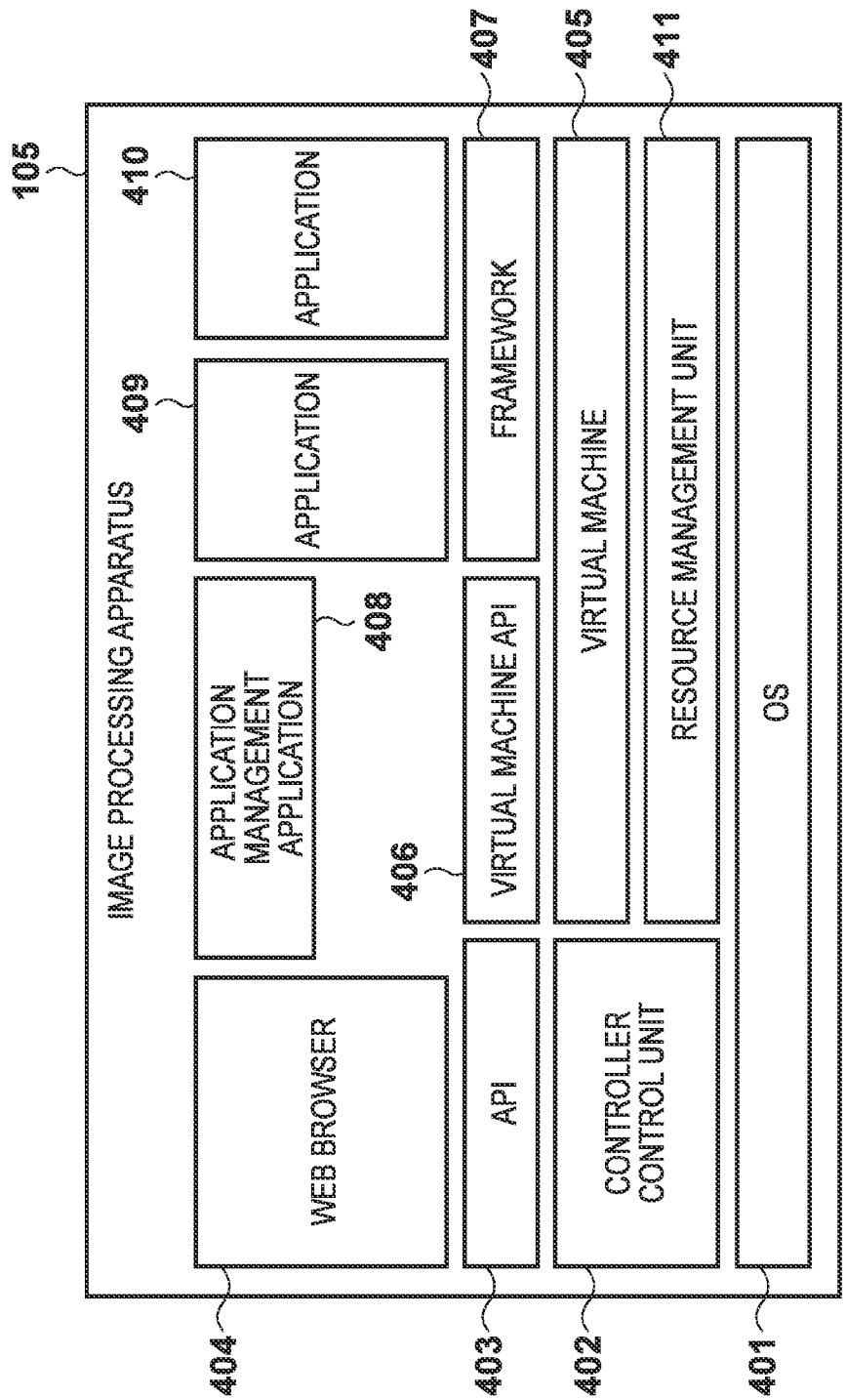
FIG. 4 is a block diagram exemplifying the software arrangement of the image processing apparatus.

FIG. 4 is a block diagram showing the basic software arrangement of the image processing apparatus 105 according to the embodiment. An OS (Operating System) 401 is the first execution environment of the present invention where the whole image processing apparatus 105 is controlled. The OS 401 is generally formed from the modules of a real-time OS capable of controlling various functions of the image processing apparatus 105 in real time, or libraries capable of instructing the CPU to critically control functions including an optional device and expansion card of a copying machine. Further, the OS 401 includes modules which provide interface commands to an application running on an upper layer.

The controller control unit 402 runs on the OS 401, and is formed from modules which control the scanner 213, printer 212, and the like. The API 403 performs processing to access the controller control unit 402 in response to an input command string from an application. The API 403 has a function of sending a control command to a device connected to a network or the like via the network I/F 210. The Web browser 404 is an application running on the OS 401, and requests various processes of the controller control unit 402 by using the API 403.

A virtual machine 405 is the second execution environment for executing a specific application, and is implemented by a Java® virtual machine or the like. The virtual machine API 406 is an API which allows an application on the virtual machine 405 to access the controller control unit 402 running on the OS 401. In the embodiment, the virtual machine API 406 has the function of a conversion module for calling the API 403. The embodiment assumes the applications 409 and 410 as an application, but an application such as the Web browser 404 is also applicable.

A framework 407 is a module having a function of performing centralized control of applications on the virtual machine 405. An application management application 408 is an application for managing other applications on the virtual machine 405, and performs downloading, uploading, erase, and invalidation of an application in cooperation with the framework 407. The applications 409 and 410 run on the virtual machine 405, and request various processes of the controller control unit 402 by using the virtual machine API 406.

A resource management unit 411 runs on the OS 401 and manages resources used by the virtual machine 405. The resource management unit 411 restricts the use of more than a predetermined number of resources when the virtual machine 405 itself, the virtual machine API 406, the framework 407, or all applications on the OS 401 use resources such as a memory. For example, when applications displayed on the screen of the operation unit 211 exceed a predetermined application upper limit, the resource management unit 411 imposes a restriction not to perform UI (User Interface) display. Note that the image processing apparatus 105 has been explained with reference to FIG. 4, but the image processing apparatus 107 also has the same arrangement.

Figure 5:
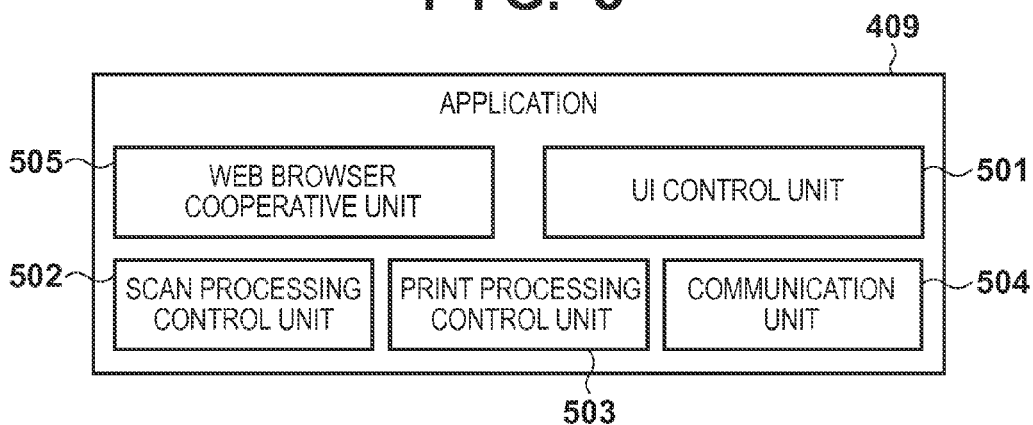
FIG. 5 is a block diagram exemplifying the arrangement of an application.

FIG. 5 is a block diagram showing the arrangement of the applications 409 and 410. A UI control unit 501 displays a UI for prompting the user to make settings for performing processing by the image processing apparatus. For example, when performing scan processing, the UI control unit 501 displays a UI for setting scan data generable by the image processing apparatus itself. When performing print processing, the UI control unit 501 displays a UI for setting acquisition of data printable by the image processing apparatus itself. The UI control unit 501 performs control to, for example, display the screen of the application 409 or 410 on the foreground of the operation unit 211 in accordance with a request from a Web browser cooperative unit 505 (to be described later).

In accordance with setting contents in the UI control unit 501, a scan processing control unit 502 performs processing considering whether the contents of output settings match the processing capability of the image processing apparatus itself. In accordance with setting contents in the UI control unit 501, a print processing control unit 503 performs processing considering whether the contents of output settings match the processing capability of the image processing apparatus itself. Details of this processing will be described later. A communication unit 504 communicates with the server 102, and performs data transmission/reception and file transmission/reception complying with a protocol such as FTP (File Transfer Protocol), SMB (Server Message Block), or WebDAV. The Web browser cooperative unit 505 communicates with the Web browser 404, and performs processing of calling the Web browser 404 or receiving an operation end notification from the Web browser 404. When the Web browser cooperative unit 505 receives an operation end notification from the Web browser 404, it requests the UI control unit 501 to display the screen of the application 409 or 410 on the foreground of the operation unit 211.

Figure 6:
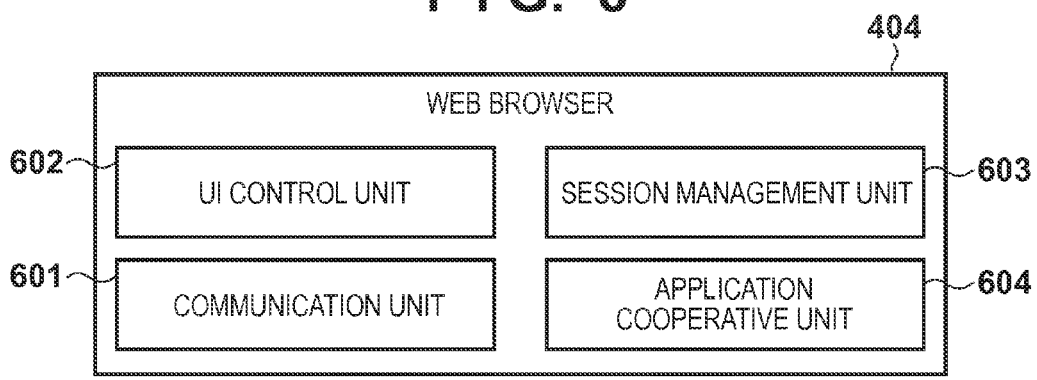
FIG. 6 is a block diagram exemplifying the arrangement of a Web browser.

FIG. 6 is a block diagram showing the arrangement of the Web browser 404. A communication unit 601 communicates with the server 102 in accordance with a protocol such as HTTP/HTTPS. The communication unit 601 can also communicate with the communication unit 504 of an application such as the application 409 in the image processing apparatus. More specifically, the communication unit 601 transmits, as a request to an application in the server 102 or the like, information input via an operation screen displayed by a UI control unit 602 of the Web browser 404. Also, the communication unit 601 receives a response (processing result) transmitted from an application executed in the server 102 or the like.

The UI control unit 602 analyzes an HTML (Hyper Text Markup Language) file contained in a response received by the communication unit 601, and displays an operation screen on the operation unit 211 based on the analysis result. The UI control unit 602 controls to display the screen of the Web browser 404 on the foreground of the operation unit 211 in accordance with a request from an application cooperative unit 604 (to be described later). A session management unit 603 manages session information when the server 102 and Web browser 404 communicate with each other.

The application cooperative unit 604 communicates with the application 409, and performs processing of receiving a request from the application 409 to call the Web browser 404 or transmitting an operation end notification to the application 409. When the application cooperative unit 604 receives a request from the application 409 to call the Web browser 404, it requests the UI control unit 602 to display the screen of the Web browser 404 on the foreground of the operation unit 211.

Figure 7:
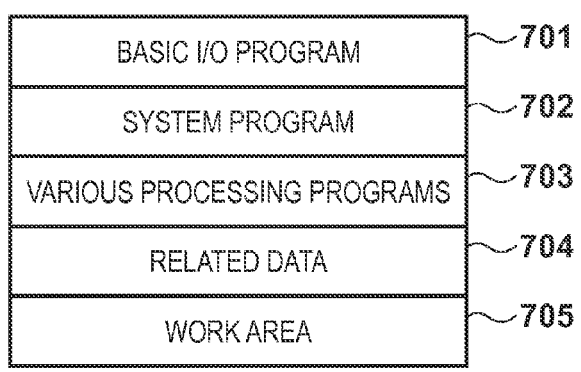
FIG. 7 is a view exemplifying the structure of a memory map in the server.

FIG. 7 is a view exemplifying the structure of a memory map when a processing program is loaded into the RAM 304 in executing the processing program according to the present invention in the server 102. Also, FIG. 7 is a view exemplifying the structure of a memory map when a processing program is loaded into the RAM 204 in executing the processing program according to the present invention in the image processing apparatus 105 or 107.

The memory map is formed from a basic I/O program 701, a system program 702 which provides an operating environment to each program, various programs 703, a related data area 704 which stores related data, and a work area 705 which is temporarily used when various programs run. When a region used as each area in the memory runs short owing to the restriction of the capacity, it is also possible to handle the HDD 305 as part of the area of the RAM 304 or handle the HDD 205 as part of the area of the RAM 204.

[Output Example]

Figure 8:
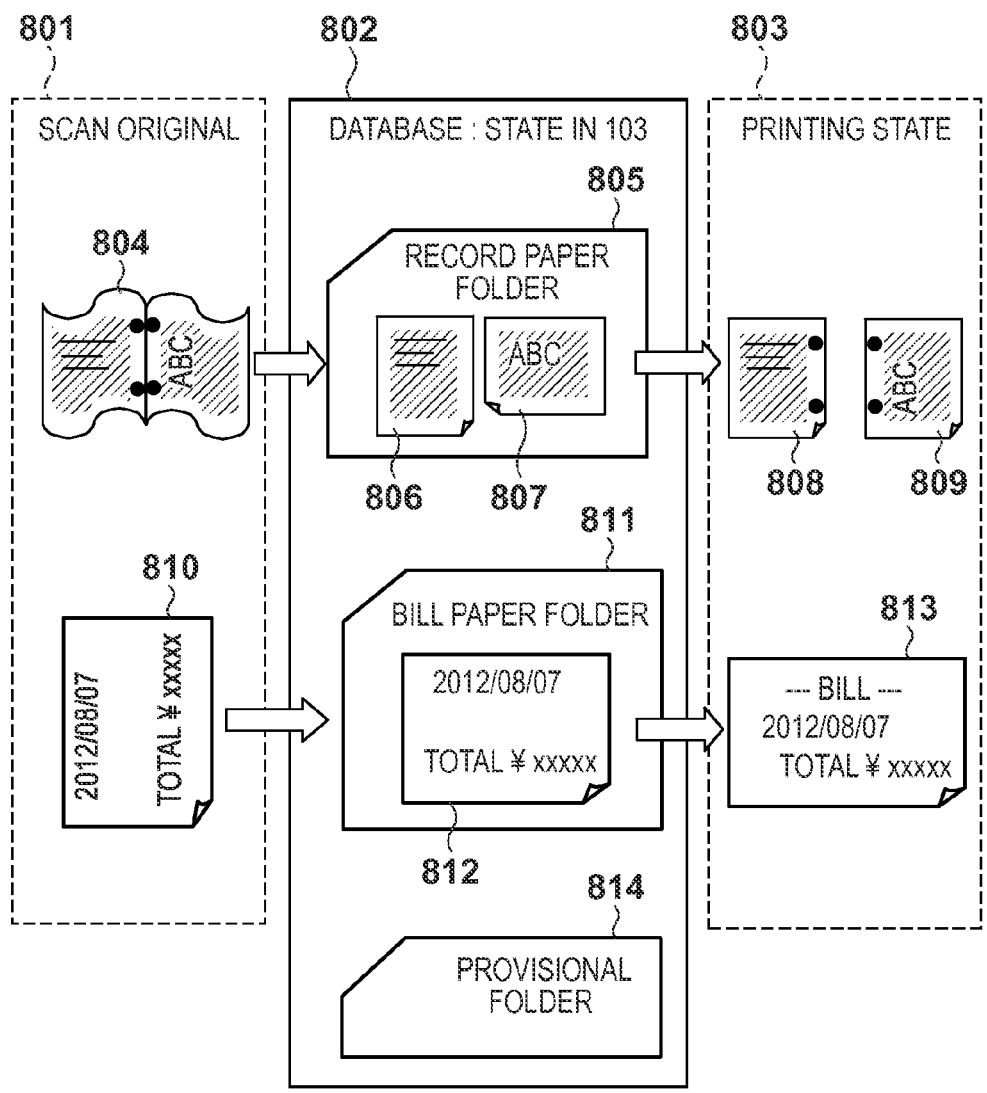
FIG. 8 is a view exemplifying a scan original, data to be stored, and a printout.

FIG. 8 is a view exemplifying a scan original, data to be stored, and a printout in the embodiment. In a description of FIG. 8, original detection & image processing information in scanning (FIGS. 9A and 9B) and restoration processing information (FIGS. 10A, 10B, and 10C) will also be referred to. In this specification, "original restoration" or "restoration" indicates controlling to output input image data with settings corresponding to the output material of the input original. For example, when image data is input from a bound original, the image data is cut out into pages for browsing so that a document which can be browsed page by page can be printed in the original bookbinding format.

Reference numeral 801 denotes a state of an original to be scanned by the image processing apparatus 105. Reference numeral 802 denotes a state of data which is obtained by processing, by the server 102, data scanned by the image processing apparatus 105 and is stored in the database 103. Reference numeral 803 denotes a state in which the image processing apparatus 105 prints the data stored in the database 103 in accordance with an instruction from the PC 106 to the server 102.

As the first example, an original 804 will be exemplified. The original 804 is a spread original, and punch holes are formed as a binding means. A left page is in the portrait orientation and has horizontal writing. A right page has horizontal writing on landscape paper and is in the portrait orientation. The user uses the operation unit 211 to designate a storage destination folder in the server 102 and execute the scan operation. The processing at this time will be explained with reference to FIG. 14.

The server 102 performs image processing (FIGS. 9A, 9B, and 15) for data received from the image processing apparatus 105, and stores the data in a "record paper folder" 805 in the database 103 that has been designated by the user in scanning.

A table 901 shown in FIG. 9A represents contents detected from data obtained by scanning the original 804 by a scan application program (not shown) of the server 102, and the contents of image processing at the time of storage in the database 103. First, an original region is detected to detect that the original 804 is an A4-size spread original. At this time, extraction of each page and detection of a margin are also performed. The presence of a punch hole and the position of the punch hole in the page are also detected. Sharpening is performed to increase the OCR accuracy and improve the visibility in browsing, and then OCR is executed. If an original is distorted upon detecting the original region, image processing such as skew correction or trapezoidal distortion correction may be performed.

After that, each page undergoes image processing to adapt its digital data to browsing. First, images are separated (extracted) for respective pages. At this time, the original margin is also held as margin information. A detected punch hole trace is erased from the first page (left page of the original 804). The second page (right page of the original 804) is rotated clockwise by 90° based on the OCR result so that it can be browsed from the same direction as that of the first page. Similar to the first page, a punch hole trace is also erased. The database 103 stores document data in which pages of page data 806 and 807 are clearly separated by the above processing. The page data 806 and 807 serve as image data (browsing images) to be browsed by the user.

Thereafter, the document data containing the page data 806 and 807 undergoes processes (FIGS. 16 to 21) according to the embodiment. Printing results 808 and 809 are results of printing by the image processing apparatus 105. The printing results 808 and 809 are obtained by changing the printing position, performing page rotation processing, and forming punch holes. By binding the printing results 808 and 809 at the punch holes, the state of the original 804 can be restored.

As the next example, an original 810 will be exemplified. The original 810 is an original of one sheet of a single page. The original 810 has horizontal writing on landscape paper. The user uses the operation unit 211 to designate a storage destination folder in the server 102 and execute the scan operation. The processing at this time will be explained with reference to FIG. 14. The server 102 performs image processing (FIGS. 9A, 9B, and 15) for data received from the image processing apparatus 105, and stores the data in a "bill paper folder" 811 in the database 103 that has been designated by the user in scanning.

A table 902 shown in FIG. 9B represents contents detected from data obtained by scanning the original 810 by the scan application program (not shown) of the server 102, and the contents of image processing at the time of storage in the database 103. First, an original region is detected to detect that the original 810 has a single page and A6 size. At this time, extraction of each page and detection of a margin are also performed. Sharpening is performed to increase the OCR accuracy and improve the visibility in browsing, and then OCR is executed. Note that a paper in the "bill paper folder" 811 is used for calculation by extracting a numerical value such as an amount of money as data. OCR is executed even for this purpose.

Thereafter, each page undergoes image processing to adapt its digital data to browsing. The original 810 is rotated clockwise by 90° based on the OCR result so that it can be browsed to face straight on the PC 106. Data 812 undergoes processes (FIGS. 16 to 21) according to the embodiment and is printed by the image processing apparatus 105, obtaining a printing result 813. The data 812 is changed into the state of the printing result 813 upon page rotation processing and form composition. A folder 814 is a "provisional folder". If the user does not designate a save destination in scanning by the image processing apparatus 105, scanned data is stored in the folder 814.

FIGS. 10A, 10B, and 10C show restoration processing tables held by a printing application program in the server 102. The restoration processing table defines conversion processing for printing (steps S2105 and S2108 in FIG. 21A) to be applied in printing in correspondence with conversion processing for browsing (step S1505 in FIG. 15) to be performed by the server 102 when storing scan data. The restoration processing tables are held independently for the respective folders serving as scan data save destinations in the database 103.

A table 1001 shown in FIG. 10A is a conversion table for the "record paper folder" 805. This table defines the correspondence between processing for browsing and processing for printing. In correspondence with rotation processing in processing for browsing, the table 1001 describes a counter rotation instruction to return the state of an original. In correspondence with page extraction processing, the table 1001 describes an instruction to restore a printing position based on detected margin information. In correspondence with punch trace erase processing, the table 1001 describes a punching instruction. In correspondence with the spread (punch binding), the table 1001 describes no instruction (definition). In correspondence with the spread (bookbinding), the table 1001 describes an instruction to perform page composition. Although the embodiment describes only conversion information necessary for the description, paper size conversion in page composition, and conversion complying with the type of binding such as stapling can also be defined.

A table 1002 shown in FIG. 10B is a conversion table for the "bill paper folder" 811. In the embodiment, papers stored in the "bill paper folder" 811 are a receipt, voucher, and the like. The embodiment assumes that these papers need not be returned to the states of originals in printing and are printed in the same direction as that of the browsing state. Hence, no conversion processing for printing is defined for various processes for browsing. This indicates that no conversion processing is performed in printing. The purpose of printing a paper in the "bill paper folder" 811 is creation of a bill.

The "bill paper folder" 811 holds an additional processing table 1003 (FIG. 10C) which defines processing to be additionally performed, regardless of conversion processing for browsing (step S1505). The additional processing table 1003 defines that form data "form A" is composited in printing and then the resultant data is printed. Note that there is neither a restoration processing table nor additional processing table associated with the "provisional folder" 814.

Note that the embodiment exemplifies only rotation, page extraction, punch hole trace erase, stapling, and spread as restoration processes. However, restorable processes such as bookbinding and Z-folding are not limited to the example in the embodiment.

FIG. 11 shows a print setting screen. A print setting screen 1101 is an example of the arrangement of a screen displayed on the PC 106 when the user accesses an application in the server 102 from the PC 106, selects document data stored in the database 103, and issues a print instruction. A region 1102 displays the path and file name of a document selected by the user. A pull-down menu 1103 allows the user to select an image processing apparatus at a printing destination. The pull-down menu 1103 lists image processing apparatuses accessible by the user. In the embodiment, the image processing apparatuses 105 and 107 connected to the PC 106 via the LAN 108 are listed as image processing apparatuses selectable as printing destinations. Note that the image data can also be output from a remote image processing apparatus by using a program for transmitting data to the remote image processing apparatus not directly connected via the LAN, through a server via the Internet 101, such as the server 102.

Radio buttons 1104 and 1105 are used to exclusively designate a printing method. The radio button 1104 is a choice to execute restoration print processing to be described later. The radio button 1105 is a choice to execute not restoration print processing but normal print processing. Print processing based on this setting will be described later with reference to FIGS. 21A and 21B.

A control 1106 is used to designate how to perform alternate processing for a portion where an image processing apparatus designated as a printing destination cannot perform restoration processing. The control 1106 displays choices of alternate means in accordance with processing to be described later with reference to FIG. 19. The user can designate an alternate processing method of his choice from alternate means displayed on the control 1106. In the embodiment, a plurality of alternate means are presented to the user to prompt him to select one of them. However, it is also possible to define the priority of alternate processing in advance, and automatically derive and provide an alternate means by a program in the processing of FIG. 19.

Radio buttons 1107 to 1109 are choices to designate a printing range. When the user designates the radio button 1107, all document data is set as a printing target. When the user designates the radio button 1108, only a range selected by the user while opening document data is set as a printing target. The radio button 1109 is a choice to print only pages designated in a document, and allows the user to further designate page numbers.

Figure 21A:
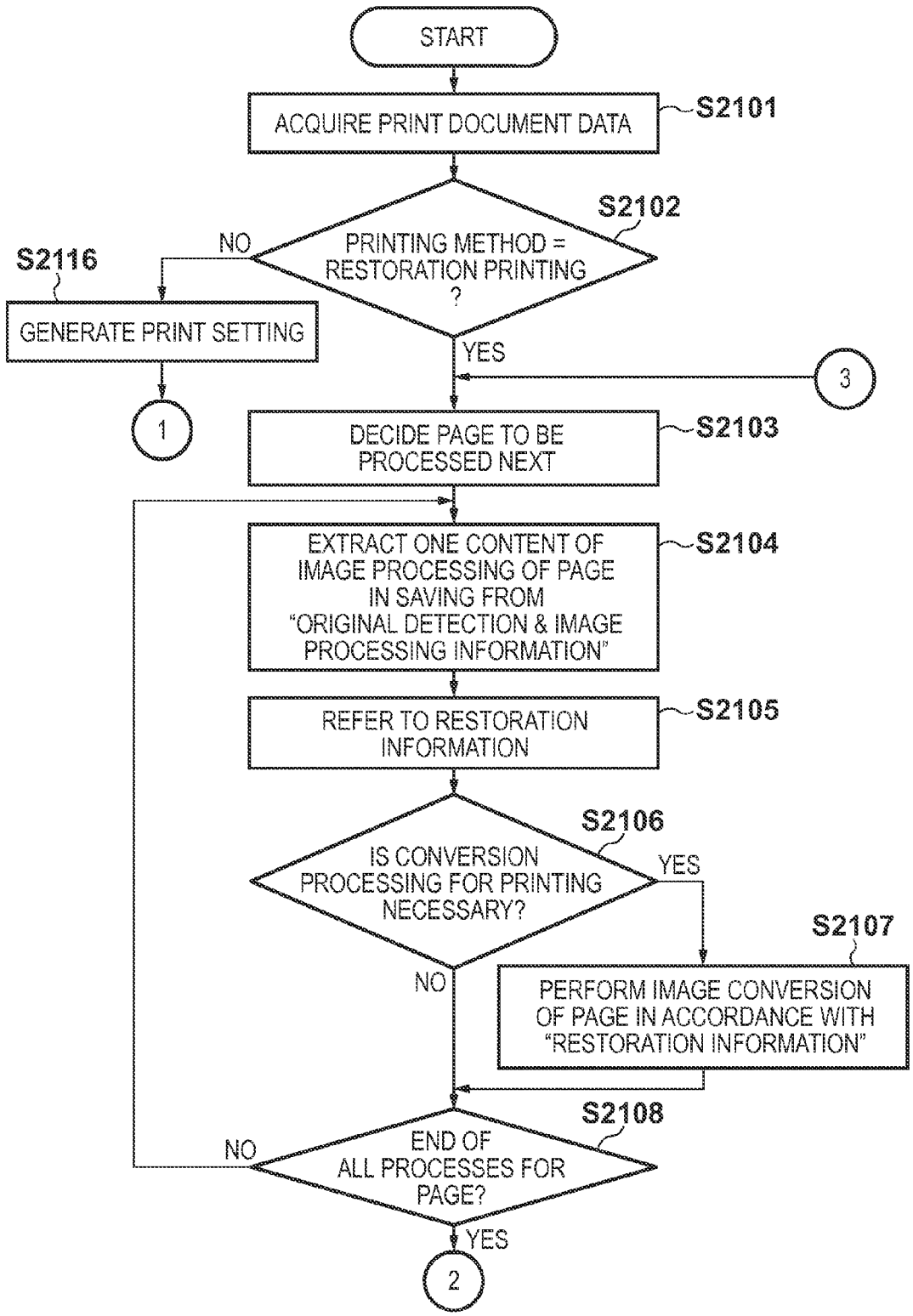
FIGS. 21A and 21B are flowcharts showing print processing.
Figure 21B:
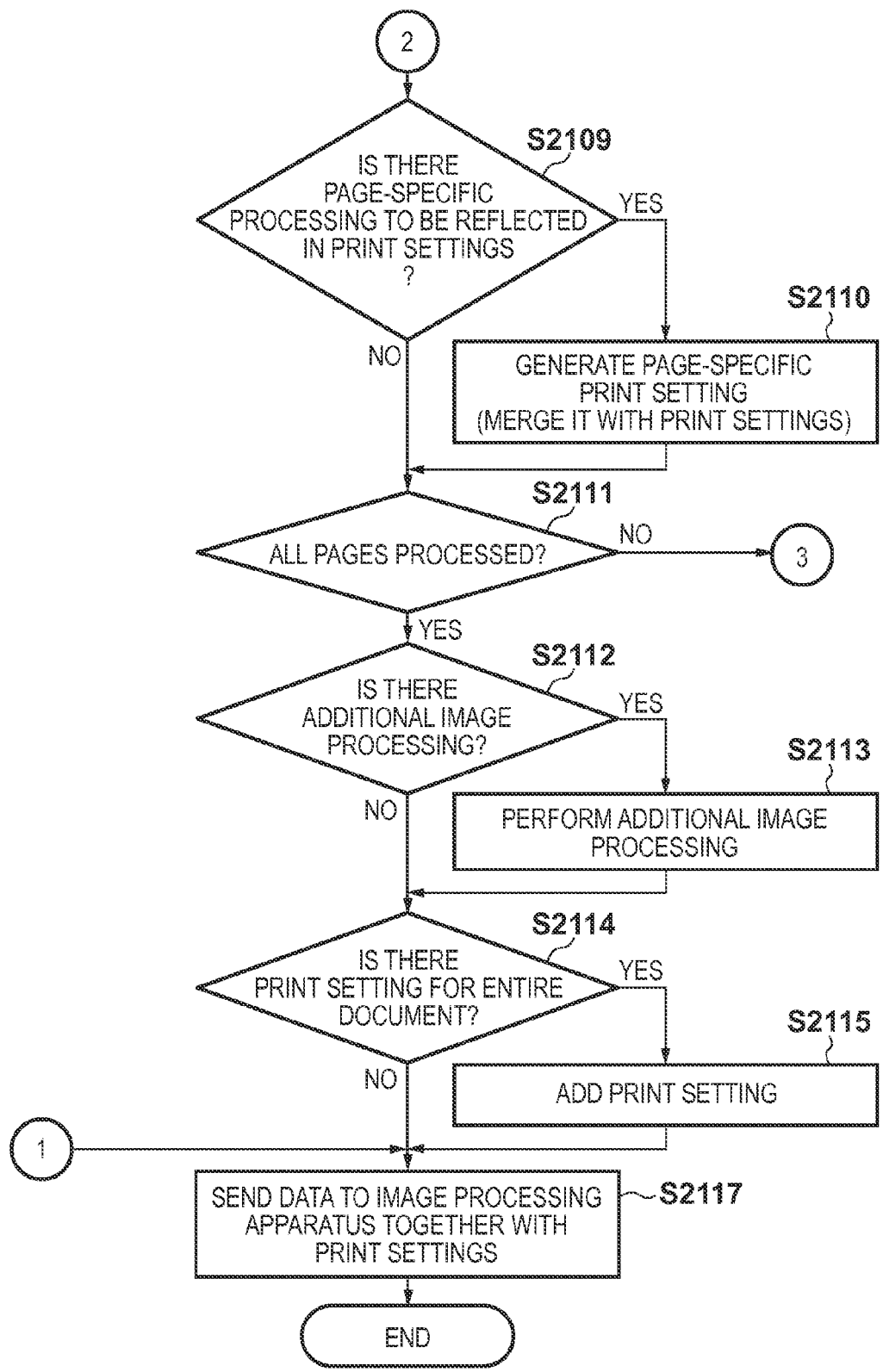

A print button 1110 is a printing execution instruction button. In response to clicking of the print button 1110, print processing to be described later with reference to FIGS. 21A and 21B is executed in accordance with destination on the print setting screen 1101. A cancel button 1111 is used to cancel printing of a document.

Figure 16:
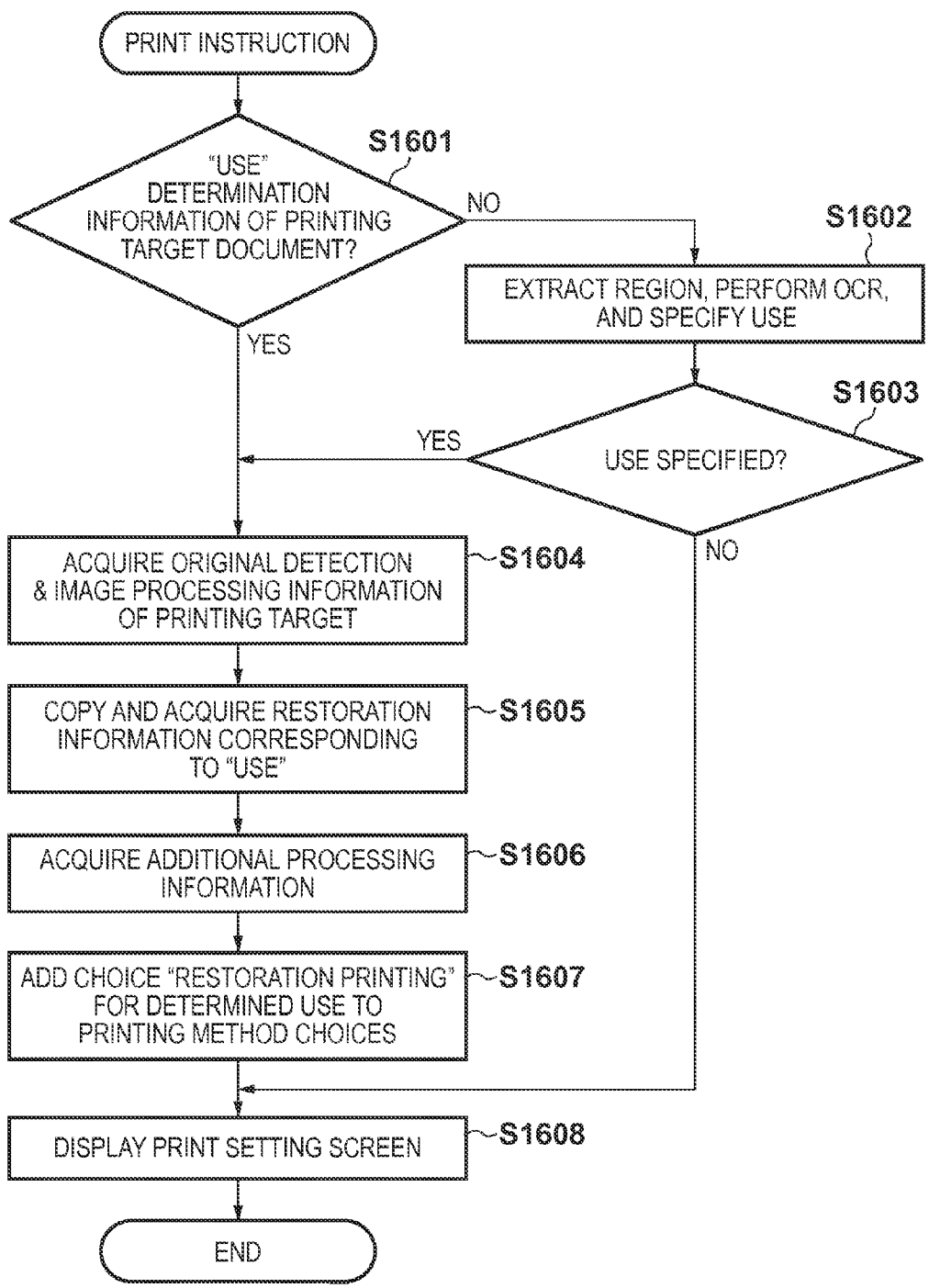
FIG. 16 is a flowchart showing processing of displaying a print setting screen upon receiving a document print instruction.

FIG. 12 shows a use specification table 1201 used in use specification processing (step S1602 in FIG. 16). The use specification table 1201 includes a detection range 1202, a detection target page 1203, a determination condition 1204, and a use 1205 derived from respective conditions. The detection range 1202 represents a range to be detected on paper. FIG. 12 illustrates the detection range 1202 for descriptive convenience. More specifically, the detection range 1202 is formed from an offset (for example, coordinate information) from the paper end, and rectangular region information representing a detection range. Note that the detection range 1202 may be held for each paper size and each paper orientation, or may be scaled and used in accordance with the paper size and paper orientation while holding only one data.

The detection target page 1203 defines a document page to be processed as a use detection target. The determination condition 1204 defines image processing to be performed for use detection. For a normal processing pattern, the detection range 1202 of the detection target page 1203 is extracted and undergoes OCR processing. Then, the use 1205 is derived in accordance with the presence/absence of a specific character string in the OCR result defined in the determination condition 1204.

Figure 18:
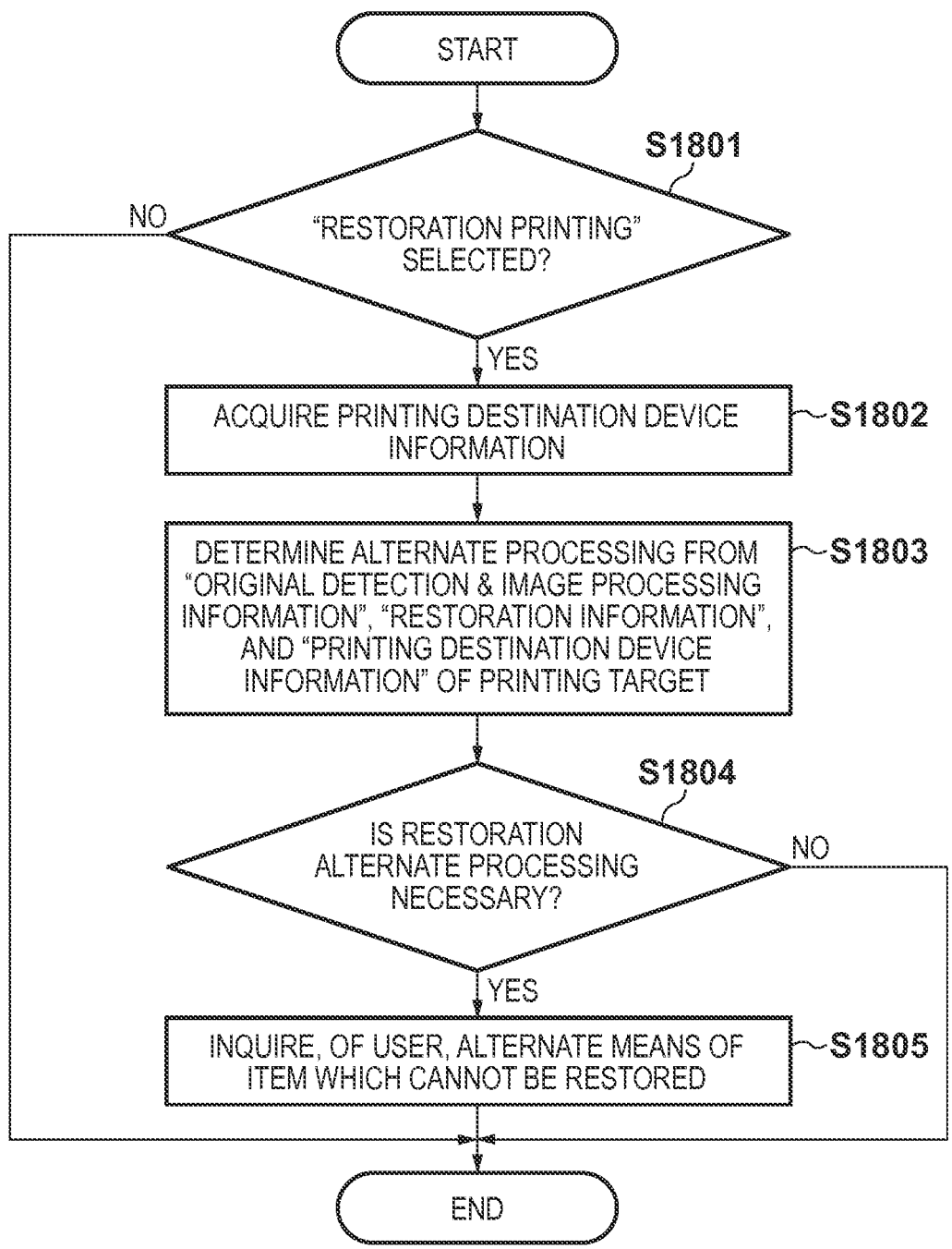
FIG. 18 is a flowchart when a printing method or printing destination is designated on the print setting screen.
Figure 19:
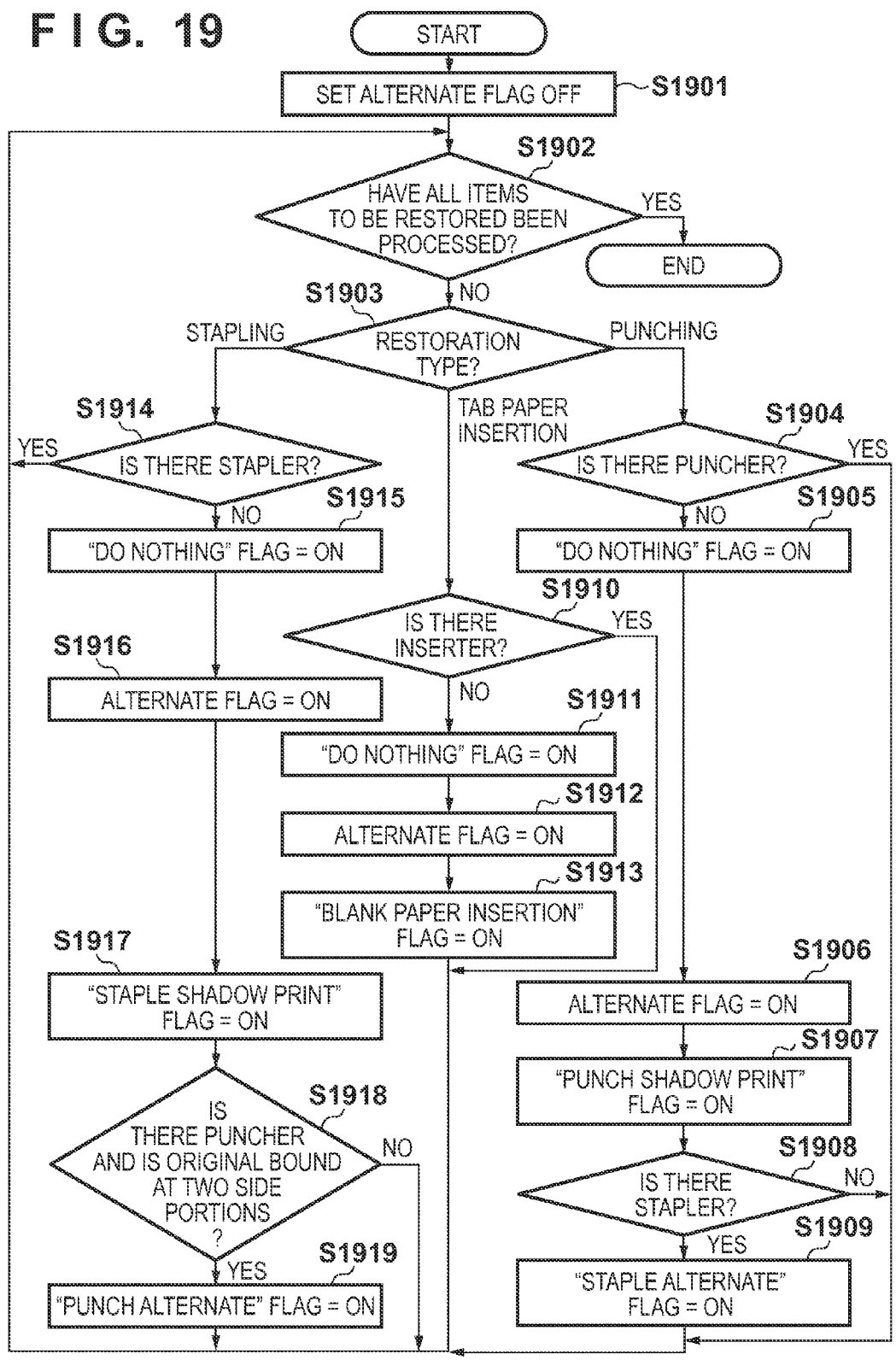
FIG. 19 is a flowchart showing processing for obtaining a restoration alternate means.

FIG. 13 shows an alternate means table 1301 used to present a restoration alternate method 1160 in restoration print processing in step S1803 of FIG. 18 (that is, FIG. 19). The alternate means table 1301 is formed from restoration processing 1302 necessary in restoration printing, a restoration necessary arrangement 1303 representing the arrangement of an image processing apparatus at a printing destination necessary for restoration processing, an alternate necessary arrangement 1304 representing the arrangement of an image processing apparatus at a printing destination necessary for alternate processing, and an alternate method choice 1305.

A line 1306 represents a case in which punching is necessary as restoration processing. If there is no puncher at a printing destination, alternate processing needs to be presented to the user. As alternate processing for punching, stapling is performed. To achieve this, the presence/absence of a stapler is involved in the alternate necessary arrangement 1304.

If a stapler exists in an image processing apparatus at a printing destination, the control 1106 presents alternate processing choices "staple at two side portions", "print the shadows of punch holes on only one page", and "no alternate processing". Note that "print the shadows of punch holes on only one page" is alternate processing on the premise that the user manually performs punching by using the printed shadows as marks. If no stapler exists in an image processing apparatus at a printing destination, alternate processing using the stapler cannot be performed. Hence, "staple at two side portions" is excluded from the three choices, and the control 1106 presents only the two processes.

A line 1307 represents a case in which stapling is necessary as restoration processing. If there is no stapler at a printing destination, alternate processing needs to be presented to the user. As alternate processing for stapling, punching is performed. Thus, the presence/absence of a puncher is involved in the alternate necessary arrangement 1304. Further, the puncher of an image processing apparatus in the environment according to the embodiment is assumed to be able to punch a hole on only the side. To make a punching position coincide with a staple position, the alternate processing is limited to one for binding at two side portions.

If a puncher is arranged in an image processing apparatus at a printing destination and can punch holes at two side portions, the control 1106 presents alternate processing choices "punch two holes", "print the shadows of staples on only one page", and "no alternate processing". Note that "print the shadows of staples on only one page" is alternate processing on the premise that the user manually performs stapling by using the printed shadows as marks. If staple positions are not two side portions, no puncher exists in an image processing apparatus at a printing destination, and two-hole punching is impossible, alternate processing using the puncher cannot be performed. In this case, "punch two holes" is excluded from the three choices, and the control 1106 presents only the two processes.

A line 1308 represents a case in which tab paper insertion is necessary as restoration processing. If there is no inserter (device for inserting tab paper) at a printing destination, alternate processing needs to be presented. As alternate processing for tab paper insertion, blank paper insertion is performed. Since blank paper insertion can be executed by normal blank paper printing, nothing is defined as the alternate necessary arrangement 1304. If no inserter exists in an image processing apparatus at a printing destination, the control 1106 presents alternate processing choices "blank paper insertion" and "no alternate processing".

[Processing Sequence]

Figure 14:
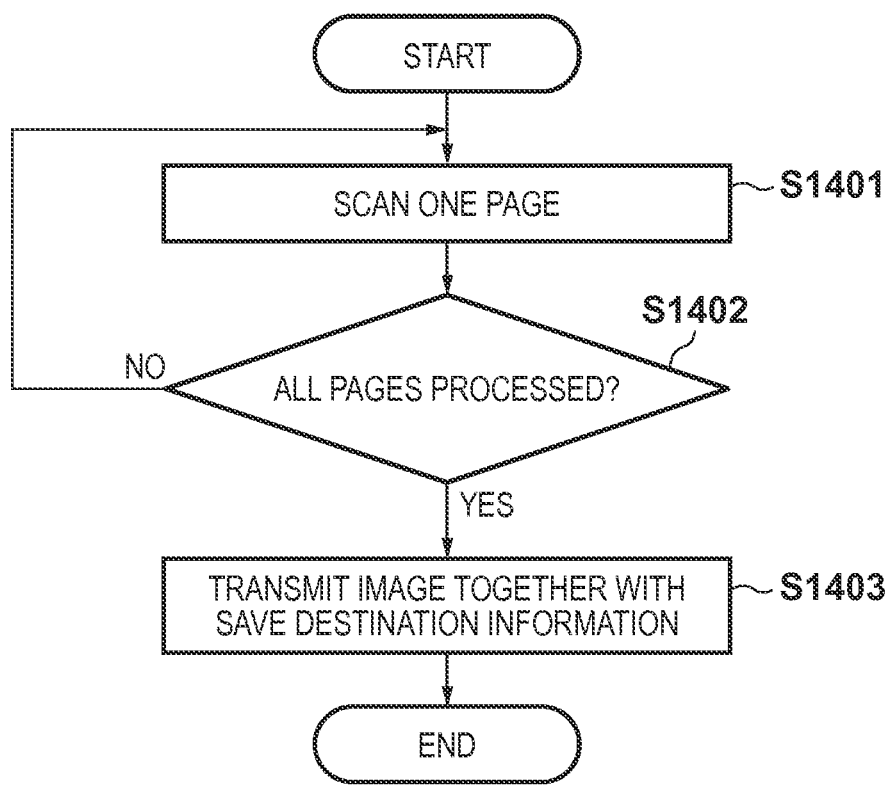
FIG. 14 is a flowchart showing scan processing in the image processing apparatus.

FIG. 14 is a flowchart showing the operation of a program in the image processing apparatus 105 when the user designates scan processing in the image processing apparatus 105. Note that the program for performing this processing also exists in the image processing apparatus 107, and the image processing apparatus 107 can also execute the processing shown in this flowchart.

The user sets an original on the image processing apparatus 105 and causes the image processing apparatus 105 to scan it. At this time, the user designates a save destination folder. In the embodiment, the user designates the "record paper folder" or "bill paper folder".

In a loop of steps S1401 and S1402, the image processing apparatus 105 reads the original page by page. After the end of reading all pages (YES in step S1402), the image processing apparatus 105 transmits, to the server 102, image data and information representing the designated save destination in step S1403.

The embodiment assumes that a single folder is designated as a save destination. That is, a document has only one use. However, it is also possible to designate a plurality of uses, and copy and save one data in a plurality of folders. If the save destination is a general file system, the entity can be stored in only one folder while links (shortcuts) are saved in the remaining folders. This mechanism enables restoring and printing one original by restoration processes complying with a plurality of uses. If image processes are defined at the time of storage in accordance with uses, document data of different forms can be easily created from one original for the respective uses.

Figure 15:
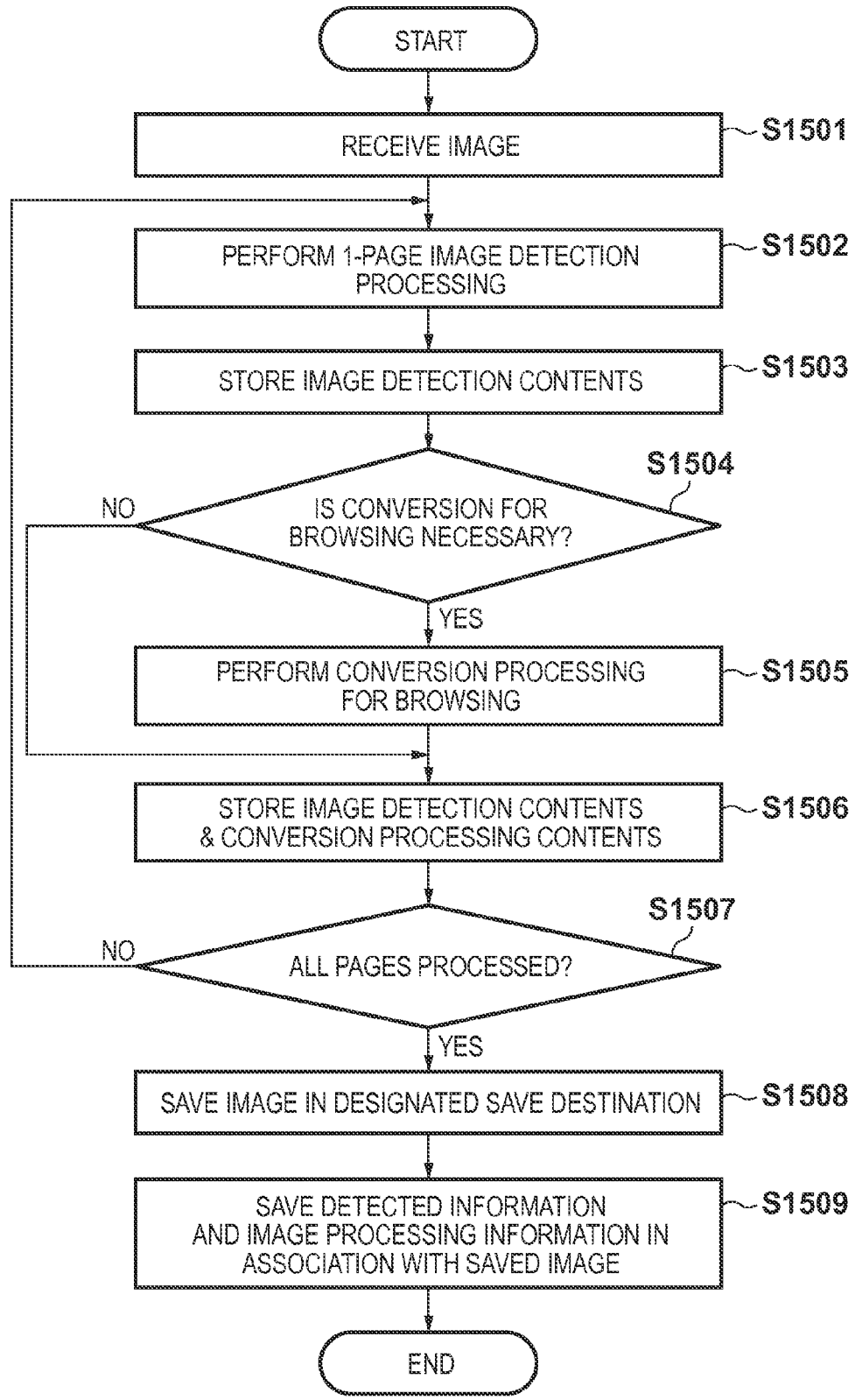
FIG. 15 is a flowchart showing processing when saving scan data.

FIG. 15 is a flowchart showing processing when the server 102 receives scan data transmitted from the image processing apparatus 105 by the processing shown in FIG. 14. In step S1501, the server 102 receives image data and save destination information. Steps S1502 to S1507 are executed for each page of the received image data. In step S1502, the server 102 detects the paper size, margin, binding position, and processing method of the image data. Further, the server 102 applies image processes such as sharpening and OCR. In step S1503, the server 102 temporarily stores the detected information and applied image processes in the RAM 304 in the format shown in FIGS. 9A and 9B. In step S1504, the server 102 determines whether further conversion processing is necessary for browsing. This determination is made based on the detected paper orientation, the character direction detected by OCR, the rotation direction determined from the detected margin, the angle, the binding position, the processing method, and the like.

If the server 102 determines that conversion processing for browsing is necessary (YES in step S1504), the server 102 performs conversion processing for browsing in step S1505. The conversion processing for browsing includes, for example, punch trace erase when there is a punch hole trace, rotation processing arising from the difference in the printing direction, page extraction when the printing region is localized in a page, and centering processing.

In step S1506, the server 102 temporarily saves the detection information stored in step S1503 and the processing contents in step S1505 in the RAM 204 in the format of FIGS. 9A and 9B. After processing all the pages (YES in step S1507), the server 102 saves the image data converted in step S1505 in a designated save destination in the database 103 in step S1508. In step S1509, the server 102 saves various kinds of primarily held information and the image data in the database 103 in correspondence with each other.

In the embodiment, the server 102 performs original detection processing (step S1502). However, the image processing apparatus 105 may perform equivalent detection processing and transmit the detected information to the server 102 in step S1403.

FIG. 16 is a flowchart when the user accesses an application in the server 102 from the PC 106 and issues an instruction to print a document stored in the database 103. This processing is executed as a Web application by the server 102, and provides a user interface via the Web browser of the PC 106 to select a document in the database 103 and issue a print instruction.

When the user selects a document and issues a print instruction, the server 102 determines in step S1601 whether the use of the printing target document has been specified. In the embodiment, the use is identified based on a folder which stores the document in the database 103. The user designates a folder to store a document when the document is scanned. If the user does not designate a storage destination folder in scanning, the document is stored in the "provisional folder" 814 in the database 103.

If no use has been specified, that is, the document exists in the "provisional folder" 814 in the embodiment (NO in step S1601), the server 102 performs use specification processing in step S1602. The use specification processing is performed in accordance with the use specification table 1201 shown in FIG. 12. In step S1603, the server 102 determines whether the use has been specified. If the use has not been specified (NO in step S1603), the server 102 excludes the document from restoration printing targets, and the process advances to step S1608. If the use has been specified (YES in step S1603), the process advances to step S1604.

If the use has been specified in step S1601, that is, the document exists in the "record paper folder" 805 or "bill paper folder" 811 (YES in step S1601), the process advances to step S1604.

In step S1604, the server 102 acquires the original detection & image processing information (FIGS. 9A and 9B) stored in the database 103 in the processing of FIG. 15. Then, in step S1605, the server 102 acquires restoration information (tables 1001 and 1002 in FIGS. 10A and 10B) associated with the specified use by copying it in the RAM 304. The purpose of copy acquisition instead of merely referring to restoration information in the database 103 will be explained. The restoration information is configured to perform the same finishing processing such as punching on the premise that printing is performed by an image processing apparatus having the same device arrangement as that in original creation. However, an image processing apparatus used by the user to print is arbitrary, and does not always have the same device arrangement as that in original creation. For this reason, the processing is changed in accordance with user designation input from the control 1106 displayed on the print setting screen 1101 based on the alternate means table 1301 of FIG. 13.

In step S1606, the server 102 acquires additional processing information (additional processing table 1003 in FIG. 10C) associated with the use of the printing target document. In the embodiment, it is not configured to rewrite the additional processing, so the information is neither copied nor acquired. However, when it is configured to rewrite the additional processing under various conditions, the information can also be copied and acquired similarly to the restoration information in step S1605.

In step S1607, the server 102 adds the printing method choice "restoration printing" 1104 to the print setting screen 1101. Finally, in step S1608, the server 102 displays the print setting screen 1101 on the PC 106 via the Web browser.

By the above processing, in the embodiment, when the use of a printing target document can be specified, restoration printing is enabled, and the printing method "restoration printing" 1104 can be selected on the print setting screen 1101. If the use of a printing target document cannot be specified, restoration printing is disabled, and only the printing method "normal printing" 1105 can be selected.

Figure 17:
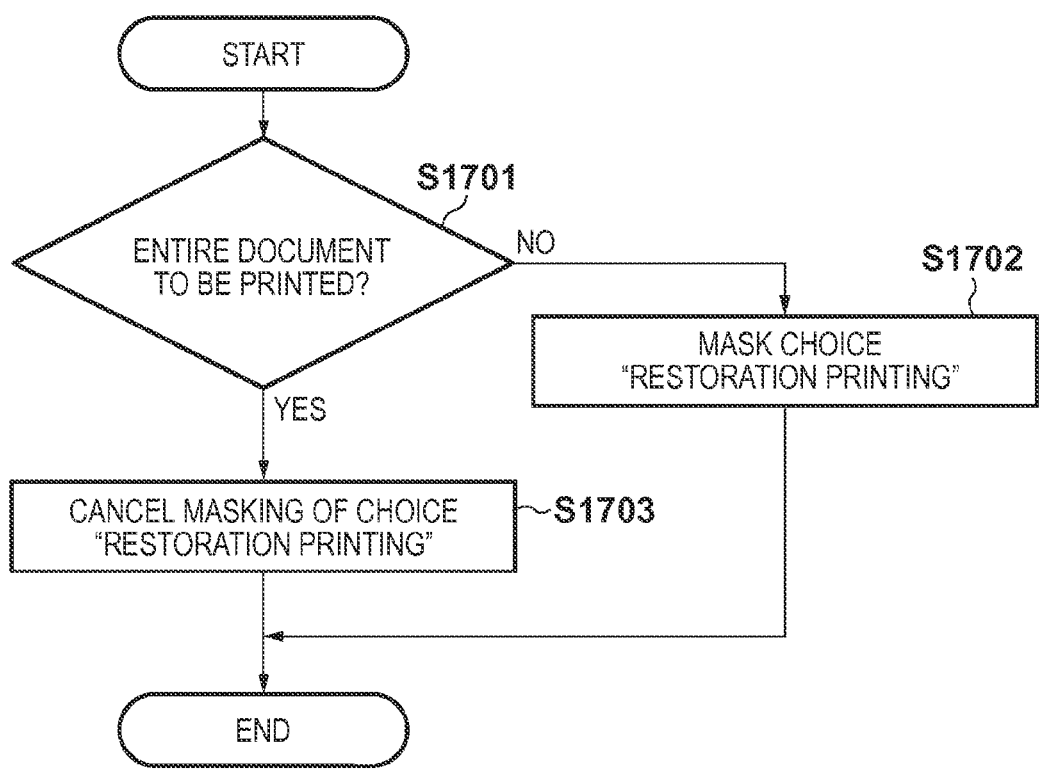
FIG. 17 is a flowchart when a printing range is designated on the print setting screen.

FIG. 17 is a flowchart by the server 102 when one of the "printing range" radio buttons 1107 to 1109 is operated on the print setting screen 1101.

In step S1701, the server 102 determines whether to print the entire document, that is, whether "all" has been selected with the radio button 1107. If the entire document has been designated (YES in step S1701), the server 102 activates the "restoration printing" 1104 in step S1703 (cancels masking if masked). If the server 102 determines that the printing range is not the entire document (NO in step S1701), it invalidates the "restoration printing" 1104 in step S1704. At this time, if the "restoration printing" 1104 has been selected, the selection shifts to the "normal printing" 1105.

By the above processing, in the embodiment, restoration printing can be executed only when the entire document is set as a printing target. Restoration printing is possible for even a partial document unless the original has a complicated layout. For example, for an original of A4 single-sided printing and left stapling, the same binding as that of the original can be executed even not from the start of the document. Even for a spread original, a printing result equivalent to the original is obtained by reproducing the same layout and binding as those of the original as long as the printing range starts from the first page to an intermediate one. In this manner, the practice of the present invention is not limited to this embodiment.

FIG. 18 is a flowchart by the server 102 when the "printing method" radio button 1104 or 1105 is operated on the print setting screen 1101 or when the pull-down menu 1103 is operated.

In step S1801, the server 102 determines whether the printing method radio button 1104 (restoration printing) has been selected. If "restoration printing" has not been selected (NO in step S1801), the server 102 ends the processing sequence without doing anything.

If "restoration printing" has been selected (YES in step S1801), the process advances to step S1802. In step S1802, the server 102 acquires information of a device (image processing apparatus) at a printing destination. The information acquired here is mainly the accessory arrangement of the image processing apparatus, for example, the presence/absence of a puncher or the presence/absence of a stapler. Further, this information includes information representing whether the accessory is usable. In step S1803, the server 102 determines the necessity of restoration alternate processing based on the printing destination device information acquired in step S1802, the original detection & image processing information (FIGS. 9A and 9B) acquired in step S1604, and the restoration information (FIGS. 10A to 10C) acquired in step S1605. The necessity of restoration alternate processing is determined by determining whether alternate processing needs to be performed when restoration processing is restricted by the function of an image processing apparatus set as a printing destination. This processing will be described in detail with reference to FIG. 19.

If the server 102 determines that restoration alternate processing is necessary (YES in step S1804), the process advances to step S1805. If restoration alternate processing is unnecessary (NO in step S1804), the server 102 ends the processing sequence without performing processing in step S1805. In step S1805, the server 102 presents choices of the restoration alternate method based on the processing result of step S1803 to allow the user to designate a restoration alternate method. Then, the processing sequence ends.

FIG. 19 is a flowchart showing presentation of the restoration alternate means in step S1803 of FIG. 18. In step S1901, the server 102 sets an alternate flag to be OFF as a state in which no restoration alternate means is to be presented. In step S1902, the server 102 determines whether all restoration processes decided from the original detection & image processing information (FIGS. 9A and 9B) of the printing target document and the restoration information (FIGS. 10A to 10C) have been performed. If all the processes have been performed (YES in step S1902), the server 102 ends the processing of this flowchart, and the process advances to step S1804 of FIG. 18. If all the processes have not been performed (NO in step S1902), the server 102 advances to step S1903 to perform processing for each restoration type.

In step S1903, the server 102 determines which of stapling, a puncher, and tab paper insertion is the type of processing to be restored. If processing to be restored is punching, processes in steps S1904 to S1909 are performed. If an image processing apparatus selected as a printing destination includes a puncher (YES in step S1904), the server 102 returns to step S1902 without doing anything. That is, alternate processing for punching need not be presented.

If the image processing apparatus selected as the printing destination does not include a puncher (NO in step S1904), the server 102 sets a "do nothing" flag to be ON in step S1905. In step S1906, the server 102 also sets an alternate flag to be ON. In step S1907, the server 102 sets a "punch shadow print" flag, which is processible by normal printing without any special apparatus, to be ON. If the image processing apparatus selected as the printing destination includes a stapler (YES in step S1908), the server 102 sets a "staple alternate" flag to be ON in step S1909, and then the process returns to step S1902. When the stapler runs out of staples, it can be determined that the stapler does not exist, or that the stapler exists after prompting the user to replenish the stapler with staples. By the processes in step S1904 to S1909, it is set to display, as restoration alternate methods on the print setting screen 1101, choices of restoration alternate processing for punching described on the line 1306 of FIG. 13.

If the type of processing to be restored is tab paper insertion, processes in steps S1910 to S1913 are performed. If the image processing apparatus selected as the printing destination includes an inserter (YES in step S1910), the server 102 returns to step S1902 without doing anything. That is, alternate processing for tab paper insertion need not be presented. When the inserter runs out of paper, it can be determined that the inserter does not exist, or that the inserter exists after prompting the user to replenish the inserter with paper.

If the image processing apparatus selected as the printing destination does not include an inserter (NO in step S1910), the server 102 sets a "do nothing" flag to be ON in step S1911. In step S1912, the server 102 also sets an alternate flag to be ON. In step S1913, the server 102 sets a "blank paper insertion" flag, which is processible by normal printing without any special apparatus, to be ON. After that, the process returns to step S1902. By the processes in step S1910 to S1913, it is set to display, as restoration alternate methods on the print setting screen 1101, choices of restoration alternate processing for tab paper insertion described on the line 1308 of FIG. 13.

If processing to be restored is stapling, processes in steps S1914 to S1919 are performed. If the image processing apparatus selected as the printing destination includes a stapler (YES in step S1914), the server 102 returns to step S1902 without doing anything. That is, alternate processing for stapling need not be presented. When the stapler runs out of staples, it can be determined that the stapler does not exist, or that the stapler exists after prompting the user to replenish the stapler with staples.

If the image processing apparatus selected as the printing destination does not include a stapler (NO in step S1914), the server 102 sets a "do nothing" flag to be ON in step S1915. In step S1916, the server 102 also sets an alternate flag to be ON. In step S1917, the server 102 sets a "staple shadow print" flag, which is processible by normal printing without any special apparatus, to be ON. If the image processing apparatus selected as the printing destination includes a puncher and the original is bound at two side portions (YES in step S1918), the server 102 sets a "punch alternate" flag to be ON in step S1919, and then the process returns to step S1902. If none of the above-described conditions is satisfied (NO in step S1918), the server 102 returns to step S1902 without doing anything. By the processes in step S1914 to S1919, it is set to display, as restoration alternate methods on the print setting screen 1101, choices of restoration alternate processing for stapling described on the line 1307 of FIG. 13.

Figure 20:
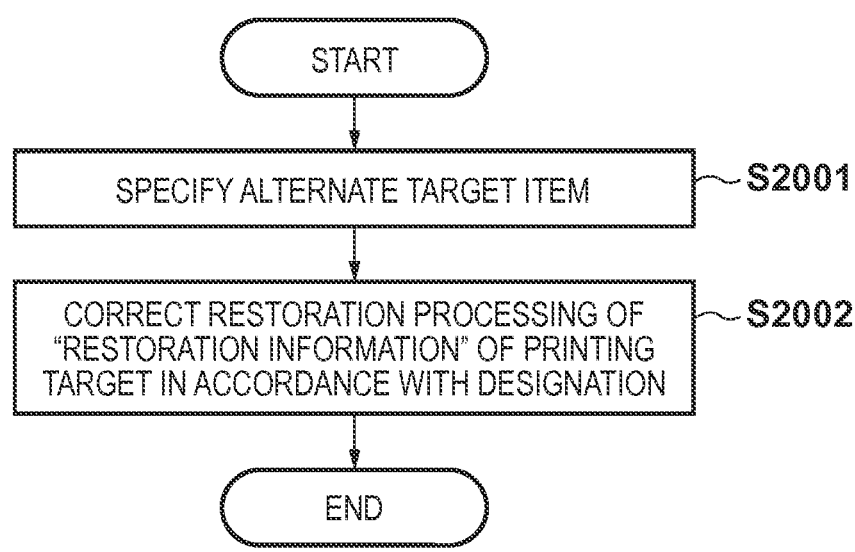
FIG. 20 is a flowchart when a restoration alternate method is designated on the print setting screen.

FIG. 20 is a flowchart by the server 102 when the control 1106 (restoration alternate method) is operated on the print setting screen 1101. In step S2001, the server 102 specifies a selected or selection-canceled item. In step S2002, the server 102 rewrites, in accordance with the specification in step S2001, the item of restoration information (tables 1001 and 1002 in FIGS. 10A and 10B) copied and acquired in step S1605. The processing sequence then ends.

FIGS. 21A and 21B are flowcharts by the server 102 when the print button 1110 is clicked on the print setting screen 1101. In step S2101, the server 102 acquires document data to be printed that has been stored in the database 103. In step S2102, the server 102 determines a printing method designated on the print setting screen 1101.

If the printing method is normal printing (NO in step S2102), the server 102 generates print settings as an instruction to the image processing apparatus in accordance with settings on the print setting screen 1101 in step S2116, and then the process advances to step S2117. In step S2117, the server 102 sends the document data acquired in step S2101 and the print settings generated in step S2116 to the image processing apparatus designated as the printing destination.

If the printing method is restoration printing (YES in step S2102), the server 102 performs processes in steps S2103 to S2115 for each page. First, in step S2103, the server 102 decides a page to be processed. The page to be printed proceeds one by one in order from the first page.

In step S2104, the server 102 extracts, from the original detection & image processing information (FIGS. 9A and 9B) acquired in step S1604, one content of image processing performed for the processing target page in saving. In step S2105, the server 102 refers to the restoration information (tables 1001 and 1002 in FIGS. 10A and 10B) rewritten in step S2001. In step S2106, the server 102 determines whether to perform processing for printing based on the restoration information with respect to the image processing performed for the processing target in saving. If processing for printing is necessary (YES in step S2106), the server 102 performs the processing for printing (restoration processing) in accordance with the restoration information in step S2107. After that, the process advances to step S2108.

If processing for printing is unnecessary (NO in step S2106), the process advances to step S2108. In step S2108, the server 102 determines whether the processes in steps S2104 to S2107 have been performed for all the image processes performed for the current processing target page in saving. If these processes have been performed (YES in step S2108), the process advances to step S2109.

In step S2109, the server 102 determines whether there is a setting which should be made for only the current processing target page as a print setting. If the server 102 determines that there is such a print setting (YES in step S2109), it merges the page-specific print setting with print settings. For example, when an A4-size portrait document includes an A3-size landscape page, the page-specific print setting corresponds to Z-folding of only this page, details of which will not be described in the embodiment.

In step S2111, the server 102 determines whether the processes in steps S2103 to S2110 have been performed for all the pages of the printing target document. If all the pages have been processed (YES in step S2111), the server 102 determines in step S2112 whether there is additional image processing acquired in step S1606. If there is additional image processing (YES in step S2112), the server 102 performs the additional image processing in step S2113. In the embodiment, the additional image processing corresponds to, for example, processing "composition of form A" defined in the additional processing table 1003 applied when printing the data 812.

In step S2114, the server 102 determines whether there is print setting processing for the entire page for restoration. If there is print setting processing to be performed (YES in step S2114), the server 102 adds processing to print settings in step S2115. In the embodiment, this processing corresponds to an instruction "punching" performed when printing a document represented by the page data 806 and 807.

Finally, in step S2117, the server 102 sends data obtained by performing image processing for image data, and the generated print settings to the image processing apparatus designated as the printing destination. As a result, the printing result is obtained by restoration processing based on the original.

As described above, even if a user who is to print scanned digital data grasps neither the state nor use of an original to be printed, the original can be printed in a format complying with the use without making complicated print settings.

Second Embodiment

In the first embodiment, data scanned by the image processing apparatus 105 is transmitted to the server 102 on the Internet 101, and the server 102 executes image detection and conversion processing. In the second embodiment, only the image processing apparatus performs all image detection and conversion processing of data scanned by an image processing apparatus, saving of document data, and processing in printing. That is, a printing unit and processing unit are arranged in a single apparatus.

Figure 22:
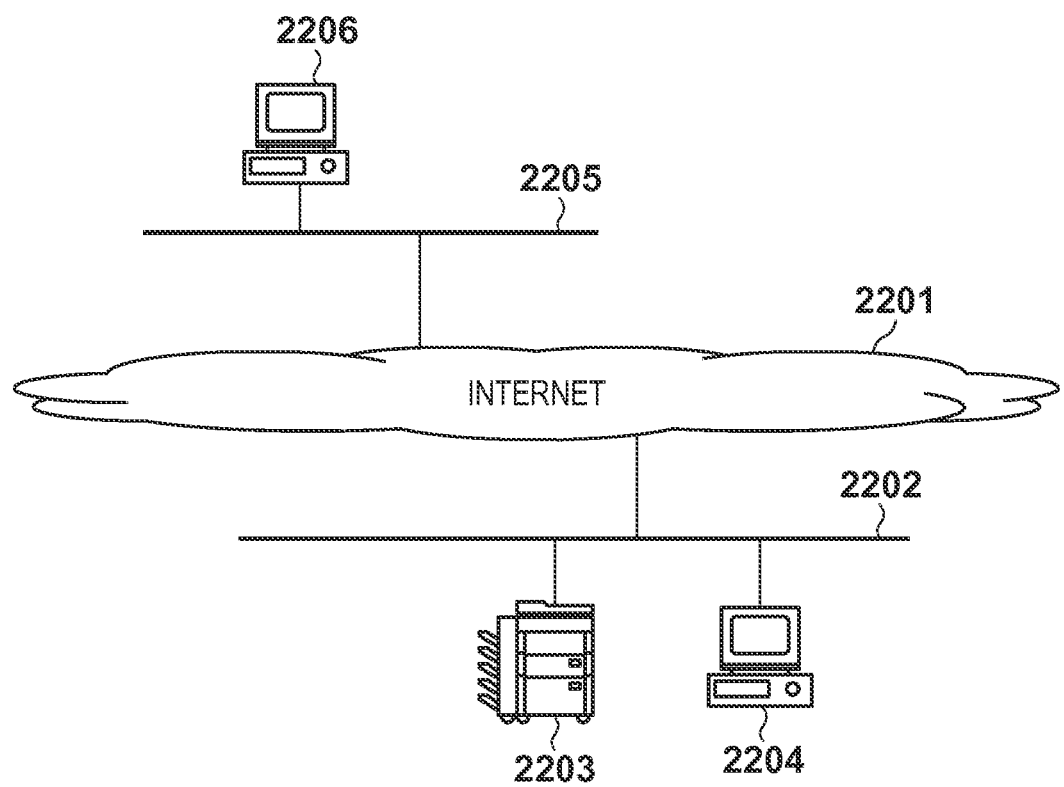
FIG. 22 is a view exemplifying the configuration of a printing system according to the second embodiment.

FIG. 22 shows an overall printing system according to the second embodiment. An image processing apparatus 2203 has the same arrangement as that of the image processing apparatuses 105 and 107 described in the first embodiment, and also has the internal arrangements in FIGS. 2 and 4 to 6. The image processing apparatus 2203 includes a scanner, and stores original information detected in scanning and scanned image data in an internal HDD 205. The HDD 205 can receive/output data from/to not only a data storage location in an image processing apparatus 105 but also an external apparatus via a network.

Applications 409 and 410 running in the image processing apparatus 2203 have the following functions. The application 409 provides a UI for scanning to an operation unit 211, and accepts input of a file name 2302 and type information 2303 of scanned data shown in FIG. 23. Scanned image data undergoes processing in FIG. 15, and is stored in the HDD 205 as document data of a format in FIG. 23 together with original detection & image processing information shown in FIGS. 9A and 9B.

In FIG. 15 described in the first embodiment, image data is received via a network in step S1501. According to the second embodiment, the application 409 in the image processing apparatus 2203 receives scanned data in step S1501. The application 410 provides a UI for printing to the operation unit 211. The application 410 displays, on the operation unit 211, a UI which displays a list of document data stored in the HDD 205 and accepts an instruction from the user to print an arbitrary document.

The application 410 also includes a Web service, and the UI for accepting a print instruction is also provided to the Web browsers of network-connected PCs 2204 and 2206. When printing of a document is designated, the application 410 displays a print setting screen 1101 in FIG. 11 and performs the processes in FIGS. 16 to 21, implementing printing by the image processing apparatus. The HDD 205 stores a use specification table 1201 and alternate means table 1301 used in this processing. Note that the printing destination can be the image processing apparatus 2203 itself or another network-connected image processing apparatus.

The PC 2204 is connected to the image processing apparatus 2203 via a LAN 2202 and can access, via the Web browser, a UI for print processing provided by the application 410 of the image processing apparatus 2203. Also, the PC 2206 on a LAN 2205 is also connectable to the image processing apparatus 2203 via the Internet 2201 and can use the application 410, similar to the PC 2204.

Figure 23:
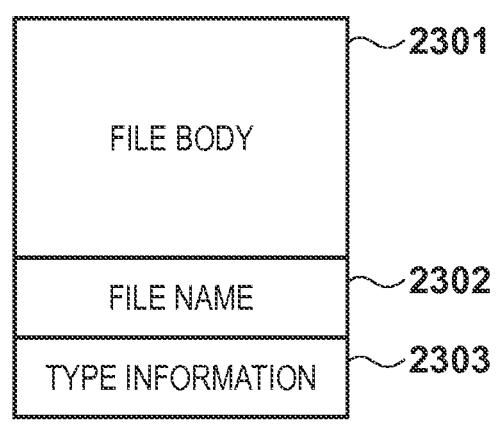
FIG. 23 is a view exemplifying the structure of document data according to the second embodiment.

FIG. 23 is a view exemplifying the structure of document data stored in the HDD 205 by the application 409 according to the second embodiment.

The file name 2302 and type information 2303 are coupled as attributes to a file body 2301. In the second embodiment, the file name 2302 and type information 2303 are designated by the user via the UI provided by the application 409. However, a program can automatically generate a file name. Further, a file name may be automatically added by executing, in the processing (FIG. 15) in scanning, the processing in step S1602 described with reference to FIG. 16 in the first embodiment.

Although the first embodiment uses a storage destination folder for use specification in step S1601, the second embodiment uses the type information 2303.

As described above, even if a user who is to print scanned digital data grasps neither the state nor use of an original to be printed, the original can be printed in a format complying with the use without making complicated print settings.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275101, filed Dec. 17, 2012, which is hereby incorporated by reference herein in its entirety.

What is claimed is:

1. A printing system comprising:
   a generation unit configured to generate a browsing image by performing first image processing for original image data acquired by scanning an original, wherein the generated browsing image is stored in a storage unit;
   a holding unit configured to hold information which defines, for each printing purpose, second image processing and print settings to be applied in printing in correspondence with the first image processing, wherein the information indicates which processing and print settings are to be applied for restoring the browsing image to a state of the original;
   a specification unit configured to specify a printing purpose for the browsing image when accepting an instruction to print the browsing image;
   a conversion unit configured to convert the browsing image into image data for printing by deciding, in accordance with the information held by the holding unit, second image processing and print settings corresponding to the printing purpose specified by said specification unit, and applying the decided second image processing and print settings to the browsing image; and
   a control unit configured to control a printing unit to output the image data for printing.

2. The system according to claim 1, wherein said holding unit holds, in correspondence with each other, the first image processing to be performed when generating a browsing image, and the second image processing and print settings to be performed when converting the browsing image into image data for printing.

3. The system according to claim 1, further comprising a unit configured to store the browsing image at a different position corresponding to each printing purpose.

4. The system according to claim 3, wherein said specification unit specifies the printing purpose for the browsing image based on the position where the browsing image is stored.

5. The system according to claim 3, further comprising a unit configured to accept the stored position of the browsing image from a user when scanning the original.

6. The system according to claim 1, wherein said specification unit specifies the printing purpose by using a character string extracted from the browsing image.

7. The system according to claim 1, further comprising:
   a determination unit configured to determine whether the printing unit includes a function corresponding to the print settings corresponding to the printing purpose specified by said specification unit; and
   a presentation unit configured to, when the printing unit does not include the function corresponding to the print settings, present an alternate setting of the print settings to allow a user to select the alternate setting,
   wherein said control unit controls the printing unit to output the image data for printing by using the alternate setting selected via said presentation unit.

8. The system according to claim 1, wherein said generation unit generates a browsing image for each page contained in the original image data acquired by scanning.

9. The system according to claim 1, wherein the holding unit further holds information of additional processing to be additionally applied in printing for the browsing image,
   wherein said conversion unit further applies the additional processing to the browsing image in accordance with the information of the additional processing to be additionally applied.

10. An image processing apparatus comprising:
    a generation unit configured to generate a browsing image by performing first image processing for original image data acquired by scanning an original, wherein the generated browsing image is stored in a storage unit;
    a holding unit configured to hold information which defines, for each printing purpose, second image processing and print settings to be applied in printing in correspondence with the first image processing, wherein the information indicates which processing and print settings are to be applied for restoring the browsing image to a state of the original;
    a specification unit configured to specify a printing purpose for the browsing image when accepting an instruction to print the browsing image;
    a conversion unit configured to convert the browsing image into image data for printing by deciding, in accordance with the information held by the holding unit, second image processing and print settings corresponding to the purpose specified by said specification unit, and applying the decided second image processing and print settings to the browsing image; and a control unit configured to control a printing unit to output the image data for printing.

11. An image processing method comprising:

generating a browsing image by performing first image processing for original image data acquired by scanning an original, wherein the generated browsing image is stored in a storage unit;

holding information which defines, for each printing purpose, second image processing and print settings to be applied in printing in correspondence with the first image processing, wherein the information indicates which processing and print settings are to be applied for restoring the browsing image to a state of the original;

specifying a printing purpose for the browsing image when accepting an instruction to print the browsing image;

converting the browsing image into image data for printing by deciding, in accordance with the information held in the holding step, second image processing and print settings corresponding to the printing purpose specified in the specifying step, and applying the decided second image processing and print settings to the browsing image; and controlling a printing unit to output the image data for printing.

12. A non-transitory computer-readable medium storing a program for causing a computer to function as a generation unit configured to generate a browsing image by performing first image processing for original image data acquired by scanning an original, wherein the generated browsing image is stored in a storage unit, a holding unit configured to hold information which defines, for each printing purpose, second image processing and print settings to be applied in printing in correspondence with the first image processing, wherein the information indicates which processing and print settings are to be applied for restoring the browsing image to a state of the original, a specification unit configured to specify a printing purpose for the browsing image when accepting an instruction to print the browsing image, a conversion unit configured to convert the browsing image into image data for printing by deciding, in accordance with the information held by the holding unit, second image processing and print settings corresponding to the print purpose specified by said specification unit, and applying the decided second image processing and print settings to the browsing image, and a control unit configured to control a printing unit to output the image data for printing.

* * * * *